(12) United States Patent
Servi et al.

(10) Patent No.: US 12,282,464 B2
(45) Date of Patent: Apr. 22, 2025

(54) SYSTEMS AND METHODS FOR REDUCING DATA COLLECTION BURDEN

(71) Applicant: The MITRE Corporation, McLean, VA (US)

(72) Inventors: Leslie David Servi, Lincoln, MA (US); Randy Clinton Paffenroth, Northborough, MA (US); Melanie Ann Jutras, Wrentham, MA (US); Deon Lamar Burchett, Arlington, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 18/378,360

(22) Filed: Oct. 10, 2023

(65) Prior Publication Data

US 2024/0054114 A1    Feb. 15, 2024

Related U.S. Application Data

(63) Continuation of application No. 17/466,738, filed on Sep. 3, 2021, now Pat. No. 11,809,391.

(60) Provisional application No. 63/074,843, filed on Sep. 4, 2020.

(51) Int. Cl.
| | |
|---|---|
| *A61N 1/00* | (2006.01) |
| *G06F 16/215* | (2019.01) |
| *G06F 18/2135* | (2023.01) |
| *G06N 5/04* | (2023.01) |

(52) U.S. Cl.
CPC ........ *G06F 16/215* (2019.01); *G06F 18/2135* (2023.01); *G06N 5/04* (2013.01)

(58) Field of Classification Search
CPC ...... G06F 16/215; G06F 18/2135; G06N 5/04
USPC .................................................. 707/600–899
See application file for complete search history.

(56) References Cited

U.S. PATENT DOCUMENTS

| | | | |
|---|---|---|---|
| 2016/0323157 A1 | 11/2016 | Marvasti et al. | |
| 2020/0193234 A1* | 6/2020 | Pai | ........................ G06F 16/904 |

OTHER PUBLICATIONS (2018). "Strategy on Reducing Regulatory and Administrative Burden relating to the Use of Health IT and EHRs" The Office of the National Coordinator for health Information Technology. (74 pages).
Boyd et al. (2010). "Distributed Optimization and Statistical Learning via the Alternating Direction Method of Multipliers" Foundations and Trends in Machine Learning 3(1):1-125.
Cai et al. (Mar. 2010). "A Singular Value Thresholding Algorithm for Matrix Completion" Siam J. Optim. vol. 20 (4):1956-1982.

(Continued)

*Primary Examiner* — Isaac M Woo
(74) *Attorney, Agent, or Firm* — Morrison & Foerster LLP

(57) ABSTRACT

A system for reducing data collection burden, comprising: one or more programs including instructions for: receiving a first set of metrics for a plurality of facilities; receiving data associated with the first set of metrics from one or more facilities of the plurality of facilities; determining one or more anomalies in the received data; removing the determined one or more anomalies from the received data; selecting a second set of metrics from the first set of metrics, wherein a number of metrics of the second set is less than a number of metrics of the first set of metrics; and outputting a recommendation applicable to the plurality of facilities based on the second set of metrics.

45 Claims, 19 Drawing Sheets

(56) References Cited

OTHER PUBLICATIONS

Cand'es et al. (Mar. 2009) "Matrix Completion with Noise" Applied and Computational Mathematics. (11 pages).
Cand'es et al. (May 2011). "Robust Principal Component Analysis" Jouranl of the ACM, vol. 58(3), Article 11. (37 pages).
Candès et al. (Apr. 2009). "Exact Matrix Completion via Convix Optimization", Foundations of Computational Mathematics 9:717-772.
Chandrasekaran et al. (Jun. 2009). "Rank-Sparsity Incoherence for Matrix Decomposition", pp. 1-24.
Cutler et al. (Nov. 2012). " Reducing Administrative Costs and Improving the Health Care System", N Engl Med 367:20.
Eckart et al. (Sep. 1936) "The Approximation of One Matrix by Another of Lower Rank" Psychometrika vol. 1 (3):211-2018.
Halko et al. (May 2011). "Finding Structure and Randomness: Probabilistic Algorithms for Constructing Approximate Matrix Decomposition" Society for Industrial and Applied Mathematics 53(2):217-288.
Paffenroth et al. (Jan. 2013). "Space-time signal processing for distributed pattern detection in sensor networks" Journal of Selected Topics in Signal Processing; vol. 6(1):1-12.
Paffenroth et al. (Jan. 2018). "Robust PCA for Anomaly Detection in Cyber Networks"; 10 pages.
Paffenroth et al. (Sep. 2013). "On covariance structure in noisy, big data", located at https://doi.org/10,1117/12,2037882. (3 pages).
Rao et al. (Feb. 2017). "The Impact of Administrative Burden on Academic Physicians: Results of a Hospital-Wide Physician Survey" Academic Medicine vol. 92(2): 7 pages.
Servi et al., U.S. Office Action dated Mar. 9, 2023, directed to U.S. Appl. No. 17/466,738; 13 pages.
Vostok et al. (2013). "Assessment of burden of mandatory reporting of health care-associated infection using the National Healthcare Safety Network in Massachusetts" American Journal of Infection Control vol. 41:466-8.

\* cited by examiner

SYSTEMS AND METHODS FOR REDUCING DATA COLLECTION BURDEN

CROSS-REFERENCE TO RELATED APPLICATION

This application is a continuation of U.S. application Ser. No. 17/466,738, filed Sep. 3, 2021, which claims the priority of U.S. Provisional Application No. 63/074,843, filed Sep. 4, 2020, the entire contents of each of which are incorporated herein by reference.

FIELD OF THE DISCLOSURE

The present invention relates to systems and methods for finding one or more redundancies in data using Robust Principal Components Analysis.

BACKGROUND OF THE DISCLOSURE

Data metrics can be used to summarize or analyze data from various sources. However, the data metrics usually include redundancies. These redundancies may increase the data burden (also referred to as data collection burden) for receiving and processing the data metrics being reported. An example of instituting requirements for reporting data metrics can be seen with government agencies. For example, government mandates metric reporting requirements to help them execute their missions. In particular, metrics may be required for the evaluation of healthcare systems and initiatives in order to improve healthcare safety, quality and value. However, collecting and managing healthcare quality measures may be expensive, time consuming and prone to inaccuracies. These inaccuracies take two forms. Some inaccuracies may be caused by the reality that attempts at precise metrics are not always met whereas others are wildly anomalous due to transcription errors, a misunderstanding of the precise requested metric or other business process errors.

The need for lessening the mandated reported metrics can be of concern. For example, in 2016, Congress passed the 21st Century Cures Act (H.R. 34, Public Law 114-255, Section 4001-Dec. 13, 2016) which identified the importance of easing regulatory burden with the use of electronic health records, EHRs, and required the Department of Health and Human Services to publicize a strategy, seek public comments and then published a final set of recommendations to reduce the burden. The recommendations were strategic in nature. One recommendation was to "reduce the effort and time required to meet regulatory reporting requirements for clinicians, hospitals, and health care organizations."

An existing set of health metrics may be unnecessarily large and onerous because the initial analysis to design the metrics did not properly account for redundancy of information between metrics. Identifying such redundancies using a standard method revolving around computing correlations between the proposed metrics is hampered because the inevitable inaccuracies in the data will give a false sense of the correlations and underlying dimensionality of the metrics. The data may also include anomalies that can include for example a major departure from what a low-rank model would have predicted for a given data set. An anomaly may also include a small collection of data points of a data set which can have potentially very large errors. Descriptions of methods including Traditional Principal Component Analysis (PCA), Robust Principal Component Analysis (RPCA), and Sparse Principal Components Analysis (SPCA) implemented alone are described below.

A. Traditional PCA

Traditional PCA works well for dimensionality reduction. However, it is not recommended for the reduction of specific metrics since PCA produces a set of results that are a linear combination of metrics. This is not useful for reducing the data burden since it means that the final output of PCA requires all the original metrics. Thus, PCA is useful for understanding the rank or underlying dimension, but does not help to select specific metrics from a set of metrics. Additionally, PCA has a disadvantage of being potentially extremely sensitive to anomalies. One anomaly in the data can drastically change the results. A brief overview of traditional PCA is provided below.

Consider a collection of points $\{x_0, \ldots, x_m\}$ with $x_i \in R^n$. Following that each point represents some object of interest, for example the n measured properties of some data provider, the set of points $\{x_0, \ldots, x_m\}$ would therefore represent the collection of data providers to be analyzed. The goal of PCA is therefore to compute a linear projection of the points $\{x_0, \ldots, x_m\}$ into a new set of points $\{\hat{x}_0, \ldots, \hat{x}_m\}$ that each lie on some k-dimensional subspace of the original n-dimensional space.

The idea is that the subspace is chosen such that each point $x_i$ has to be moved as little as possible to make it lie on the k-dimensional subspace. If the measurement $x_i$ is encoded into a matrix $X \in R^{m \times n}$ with each $x_i$ being a row of X, then the low-dimensional representation X can be found by solving an optimization problem such as described in Equation 1:

$$\min_L \|L - X\|_F^2 \quad (1)$$
$$\text{subject to } \rho(L) \leq k$$

where $\|L-X\|_F^2$ is the sum of the squares of the entries of L−X (often called the Frobenius norm), $L \in R^{m \times n}$ and $\rho(L)$ is the rank of L (the dimension of the subspace spanned by the rows of L).

The optimization problem in Equation 1 is often solved by way of the Singular Value Decomposition (SVD). In particular, by the SVD it is known that $X = U\Sigma V^T$ where, assuming that n<m, we have $U \in R^{m \times n}$ and U is unitary in that $U^T U = I$; $V \in R^{n \times n}$ and V is unitary in that $V^T V = I$; and $\Sigma \in R^{n \times n}$ and $\Sigma$ is diagonal with positive diagonal entries $\sigma_i$ called the singular values of X.

Further, assuming the singular values are ordered such that $\sigma_i \geq \sigma_{i+1}$ and, for a given matrix X, $X_{i,j,k,l}$ may denote the principle sub-matrix of X comprised of rows i through j and columns k through l, one can write the Principal Component Analysis as $$X = \begin{bmatrix} U_{1:k,1:k} & U_{1:k,k+1:m} \\ U_{k+1:n,1:k} & U_{k+1:n,k+1:m} \end{bmatrix} \begin{bmatrix} \Sigma_{1:k,1:k} & 0 \\ 0 & \Sigma_{k+1:n,k+1:n} \end{bmatrix}$$
$$\begin{bmatrix} V_{1:k,1:k} & V_{1:k,k+1:n} \\ V_{k+1:n,1:k} & V_{k+1:n,k+1:n} \end{bmatrix}$$

Now, by assumption, every entry of $\Sigma_{k+1:n,k+1:n}$ is smaller than the smallest entry of $\Sigma_{1:k,1:k}$, X may be approximated by setting $\Sigma_{k+1:n,k+1:n} = 0$ and getting $$X \approx \begin{bmatrix} U_{1:\,k,1:\,k} & U_{1:\,k,k+1:\,m} \\ U_{k+1:\,n,1:\,k} & U_{k+1:\,n,k+1:\,m} \end{bmatrix} \begin{bmatrix} \Sigma_{1:\,k,1:\,k} & 0 \\ 0 & 0 \end{bmatrix} \begin{bmatrix} V_{1:\,k,1:\,k} & V_{1:\,k,k+1:\,n} \\ V_{k+1:\,n,1:\,k} & V_{k+1:\,n,k+1:\,n} \end{bmatrix}$$

$$= \begin{bmatrix} U_{1:\,k,1:\,k} & 0 \\ U_{k+1:\,n,1:\,k} & 0 \end{bmatrix} \begin{bmatrix} \Sigma_{1:\,k,1:\,k} & 0 \\ 0 & 0 \end{bmatrix} \begin{bmatrix} V_{1:\,k,1:\,k} & V_{1:\,k,k+1:\,n} \\ 0 & 0 \end{bmatrix}$$

$$= \begin{bmatrix} U_{1:\,k,1:\,k} \\ U_{k+1:\,n,1:\,k} \end{bmatrix} [\Sigma_{1:\,k,1:\,k}] [\,V_{1:\,k,1:\,k} \quad V_{1:\,k,k+1:\,n}\,]$$

$$= \hat{U}\hat{\Sigma}\hat{V}^T$$

It can be observed that if X is exactly of rank k then equality in the above equation holds (since $\Sigma_{k+1:\,n,k+1:\,n}=0$ is already true). Similarly, $\hat{U}\hat{E}\hat{V}^T$ is the optimal low-rank approximation of X. So, X can be compressed to k metrics by computing $X[V_{1:\,k,1:\,k} \quad V_{1:\,k,k+1:\,n}]^T$ and reconstructed by using $(X[V_{1:\,k,1:\,k} \quad V_{1:\,k,k+1:\,n}]^T) [V_{1:\,k,1:\,k} \quad V_{1:\,k,k+1:\,n}]$.

As shown above, PCA has two deficiencies. First, while PCA effectively compresses the input measurements, each of the k principal components in general depends on all of the n original measurements. Thus, PCA does not reduce a data processing burden since typically PCA requires all of the original metrics to make its compressed version.

Second, the data sets of interest may have anomalies that are not actually part of the true representation of the data. Such anomalies, if present in X, will tend to introduce large inaccuracies in the SVD of X due to the squared error in Equation 1. Thus, PCA's recovery of the original metrics is inaccurate due to anomalies, and the inaccuracy due to anomalies may be worsened by relying on the squared error.

Furthermore, sometimes a data set without anomalies has the property that knowing just k of the columns is sufficient for reconstructing all the columns exactly. In the presence of anomalies or when the following mathematical statement—that any k columns of X can be used to reconstruct the other n-k columns of X if X is of exactly rank k and X contains no anomalous values—is only approximately true, it is difficult to determine the value of rank k.

B. Sparse PCA

As opposed to PCA, in which the principal components are generally linear combinations of all of the metrics, one can instead consider Sparse PCA in which individual metrics are chosen to reconstruct the rest.

Consider $\mathfrak{S}$ as a selection matrix with $\mathfrak{S} \in \{0, 1\}^{n \times K}$ and every column of S has precisely a single entry of 1 and every row of S has at most a single entry of 1. For example, when the matrix $\mathfrak{S}$ is set to $$\mathfrak{S} = \begin{bmatrix} 1 & 0 & 0 \\ 0 & 0 & 0 \\ 0 & 1 & 0 \\ 0 & 0 & 1 \\ 0 & 0 & 0 \\ 0 & 0 & 0 \end{bmatrix}$$

and $X_K = X\mathfrak{S}$, then $\mathfrak{S}$ selects in $X_K$ the 1-st, 3-rd and 4-th column of an X that originally had 6 columns.

More generally, to estimate X from $X_K$, two properties are involved. First, the estimate $\hat{X}$ of X should have the property that it agrees with X on $\mathfrak{S}$, in other words there is some Z such that $$\hat{X} = X\mathfrak{S}\mathfrak{S}^T + Z(I - \mathfrak{S}\mathfrak{S}^T) = X_K \mathfrak{S}^T + Z(I - \mathfrak{S}\mathfrak{S}^T)$$

Second, the estimate $\hat{X}$ must lay on the subspace spanned by singular vectors of X. Equivalently, that is $$\hat{X} = \hat{X}VV^T.$$

Plugging the first into the second results in the following $$X_K \mathfrak{S}^T + Z(I - \mathfrak{S}\mathfrak{S}^T) = (X_K \mathfrak{S}^T + Z(I - \mathfrak{S}\mathfrak{S}^T))VV^T$$

which implies Z can be expressed only depends on $X_K$, i.e., $$Z = X_K(\mathfrak{S}^T - \mathfrak{S}^T VV^T)(I - \mathfrak{S}\mathfrak{S}^T)VV^T - (I - \mathfrak{S}\mathfrak{S}^T))^{-1}.$$

C. Robust PCA Convex Optimization Approach

The Convex Optimization approach is based on Robust Principal Component Analysis (RPCA). The RPCA approach will both remove anomalies and provide a low rank approximation of the original data. This is accomplished with a combination of a nuclear norm and a one norm which is regularized by a tuning parameter λ to induce sparsity. The Robust PCA formulation is as follows in Equation 2:

$$\min_{L,S} \rho(L) + \lambda \|S\|_0 \qquad (2)$$

subject to $|X - (L + S)| = 0$ where ρ(L) is the rank of L, $\|S\|_0$ is the number of nonzero entries in S, and λ is a coupling constant which controls the trade-off between the low-rank matrix L and the sparse matrix S. According to Equation 2, the data X can be divided into two components: i) L which can be reproduced exactly using a small number of metrics and (ii) S, a sparse (i.e., mainly 0's) set of data consisting of the anomalous data. Any matrix X can be made low-rank if you change many entries (for example, set them all to 0). However, it is mathematically useful to know how to make X low-rank by only changing the fewest number of entries as possible. According to Equation 2, λ is configured to determine "how much change in the rank of X is needed to allow a particular entry". A large λ indicates that it is preferred to keep the rank the same, and not change entries. A small λ indicates that it is preferred to change many entries as long as the rank changes at least a little. Therefore, λ is configured as a trade-off between the low-rank matrix L and the sparse matrix S.

Unfortunately, as opposed to Equation 1, a closed form solution to Equation 2 is unknown. Even worse, a naïve, brute force approach to the problem, where one searches over all possible combinations of low-rank matrices L and entries of S corresponding to a presupposed number of anomalies, would be NP-hard in the number of anomalies.

However, theorems in the extant literature provide remarkable guarantees for recovery L and S. Providing details for these theorems would be too far afield in the current context. Herein it is observed that the optimization in Equation 2 is NP-hard, but a closely related problem can be solved if some technical conditions are met. Classically, these conditions bound the rank of L, bound the sparsity of S, require that the columns of L are incoherent far from the standard basis, and require that the non-zero entries in S are distributed uniformly. In particular, assuming such conditions are met, then, with high probability the convex program may be as described as follows in Equation 3:

$$\min_{L,S} \|L\|_* + \lambda \|S\|_1 \quad (3)$$

subject to $|Y - (L + S)| = 0$ recovers L and S, where $\|L\|_* = \sum_{i=1}^m \sigma_i$ is the nuclear norm of L (i.e., the sum of the singular values of L) and $\|S\|_1 := \sum_{ij} |S_{ij}|$. $\lambda$ is as in (3). The reader familiar with such algorithms will note that $\|S\|_1$ is a convex relaxation of $\|S\|_0$, and $\|L\|_*$ is a convex relaxation of $\rho(L)$, and such problems can be efficiently solved.

Note, in Equation 3, the importance of the parameter $\lambda$. Setting $$\lambda = \frac{1}{\sqrt{\max(m, n)}},$$

where $Y \in R^{m \times n}$ guarantees the recovery of L and S from Y (assuming the constraints mentioned previously).

SUMMARY OF THE DISCLOSURE

PCA, RPCA, and SPCA do not individually provide the ability to output a recommendation of a smaller metric set from an original set of metrics in the presence of anomalies in data associated with the original set of metrics. The smaller metric set comprises a number of metrics less than a number of metrics of the original set. Specifically, PCA is configured for dimensionality reduction, not for the reduction of metrics. In the absence of anomalies, PCA is configured to find a collection (combination) of metrics and implicitly recommend a number of metrics to represent the collection. While RPCA may be able to identify the rank of the data even in the presence of anomalies, it may not be able to sufficiently reconstruct non-selected metrics to makes its use effective. SPCA is configured to identify a subset of a matrix, however, SPCA is not reliable in the presence of anomalies which causes SPCA to overestimate a minimum number of metrics.

To address the above issues, systems and methods disclosed herein first determine anomalies for a data set associated with a first set of metrics and then recommend a second set of metrics for reducing a data processing burden of the dataset. A number of metrics of the second set of metrics may be smaller than a number of metrics of the first set of metrics. In some embodiments, the anomalies may be removed by RPCA. In some embodiments, the second set of metrics may be determined by SPCA based on the determined anomalies. In some embodiments, the second set of metrics may be a subset of the first set of metrics. In some embodiments, the systems and methods disclosed herein implement a machine learning approach to assist with the recommendation to "reduce the effort and time required to meet regulatory reporting requirements for clinicians, hospitals, and health care organizations," published by the Office of the National Coordinator for Health Information Technology.

In some embodiments, advanced methods may effectively correct for inaccuracies in the data, identify and remove anomalous reported metrics, and after inaccuracies have been corrected and after anomalies have been removed, then the resulting correlations and dimensionality structure may be examined. In some embodiments, a promising data driven analytical method to reduce metric reporting requirements burden without compromising the information is disclosed herein. This method may be applied to real data and may be validated through synthetic data. For example, the method may be applied to health metrics obtained from public use files collected over a period of one year. The method may be validated by applying synthetic data where ground truth is known and both small errors and anomalous errors were intentionally inserted.

In some embodiments, a system for reducing data burden (also referred to as data collection burden), comprises: one or more processors; memory; one or more programs configured for execution by the one or more processors, the one or more programs including instructions for: receiving a first set of metrics for a plurality of facilities, the plurality of facilities having a total number of facilities; receiving data associated with the first set of metrics from one or more facilities of the plurality of facilities; determining one or more anomalies in the received data; removing the determined one or more anomalies from the received data; selecting a second set of metrics from the first set of metrics, wherein a number of metrics of the second set is less than a number of metrics of the first set of metrics; and outputting a recommendation applicable to the plurality of facilities based on the second set of metrics.

In any of these embodiments, the one or more anomalies may be determined by Robust Principal Component Analysis (RPCA).

In any of these embodiments, the one or more anomalies determined by RPCA may be interpreted as a guidance for selecting the second set of metrics.

In any of these embodiments, the one or more programs may include instructions for inserting anomalies into the received data and determining a value of a parameter associated with a protocol, the value configured to enable the protocol to detect the inserted anomalies and select the second set of metrics.

In any of these embodiments, the one or more programs may include instructions for determining an accuracy of the recommendation.

In any of these embodiments, the second set of metrics may be selected by Sparse Principal Component Analysis (SPCA).

In any of these embodiments, the one or more programs may include instructions for computing a variable configured to infer non-selected metrics of the first set of metrics that are not included in the second set of metrics.

In any of these embodiments, the one or more programs may include instructions for inferring the non-selected metrics of the first set of metrics that are not included in the second set of metrics based on the computed variable.

In any of these embodiments, the recommendation may be configured to recommend the second set of metrics for reducing a data processing burden of the received data without appreciable loss of information.

In any of these embodiments, the received data may include one or more of real data and synthetic data.

In any of these embodiments, selecting the second set of metrics may include selecting metrics from the first set of metrics that are less expensive to measure than non-selected metrics of the first set of metrics, the non-selected metrics are not included in the second set of metrics.

In any of these embodiments, selecting the second set of metrics may include selecting metrics in which a probability of one or more anomalies in the received data associated with the second set of metrics is smaller than a probability of one or more anomalies in the received data associated with the first set of metrics. The non-selected metrics are not included in the second set of metrics.

In any of these embodiments, the recommendation may include guidance, the guidance comprising one or more of: avoiding data points identified to be associated with the one or more anomalies and using the second set of metrics.

In any of these embodiments, the data may be associated with one or more metrics from one or more of Group Practice Reporting Option Features, Consumer Assessment of Healthcare Providers Survey Features, and Electronic Health Record Features.

In any of these embodiments, the data received may be associated with the first set of metrics from each facility of one or more facilities of the plurality of facilities if data from each facility of the plurality of facilities is unavailable.

In some embodiments, a method for reducing data burden, comprises: receiving a first set of metrics for a plurality of facilities, the plurality of facilities having a total number of facilities; receiving data associated with the first set of metrics from one or more facilities of the plurality of facilities; determining one or more anomalies in the received data; removing the determined one or more anomalies from the received data; selecting a second set of metrics from the first set of metrics, wherein a number of metrics of the second set is less than a number of metrics of the first set of metrics; and outputting a recommendation applicable to the plurality of facilities based on the second set of metrics.

In any of these embodiments, the one or more anomalies may be determined by Robust Principal Component Analysis (RPCA).

In any of these embodiments, the one or more anomalies determined by RPCA may be interpreted as a guidance for selecting the second set of metrics.

In any of these embodiments, the method may include inserting anomalies into the received data and determining a value of a parameter associated with a protocol, the value configured to enable the protocol to detect the inserted anomalies and select the second set of metrics.

In any of these embodiments, the method may include determining an accuracy of the recommendation.

In any of these embodiments, the second set of metrics may be selected by Sparse Principal Component Analysis (SPCA).

In any of these embodiments, the method may include computing a variable configured to infer non-selected metrics of the first set of metrics that are not included in the second set of metrics.

In any of these embodiments, the method may include inferring the non-selected metrics of the first set of metrics that are not included in the second set of metrics based on the computed variable.

In any of these embodiments, the recommendation may be configured to recommend the second set of metrics for reducing a data processing burden of the received data without appreciable loss of information.

In any of these embodiments, the received data may include one or more of real data and synthetic data.

In any of these embodiments, selecting the second set of metrics may include selecting metrics that are less expensive to measure than non-selected metrics of the first set of metrics, the non-selected metrics are not included in the second set of metrics.

In any of these embodiments, selecting the second set of metrics may include selecting metrics in which a probability of one or more anomalies in the received data associated with the second set of metrics is smaller than a probability of one or more anomalies in the received data associated with the first set of metrics. The non-selected metrics are not included in the second set of metrics.

In any of these embodiments, the recommendation may include guidance, the guidance comprising one or more of: avoiding data points identified to be associated with the one or more anomalies and using the second set of metrics.

In any of these embodiments, the data may be associated with one or more metrics from one or more of Group Practice Reporting Option Features, Consumer Assessment of Healthcare Providers Survey Features, and Electronic Health Record Features.

In any of these embodiments, the data received may be associated with the first set of metrics from each facility of the one or more facilities of the plurality of facilities if data from each facility of the plurality of facilities is unavailable.

In some embodiments, a non-transitory computer readable storage medium storing one or more programs is provided. The one or more programs configured to reduce a data processing burden, the one or more programs comprising instructions, which when executed by an electronic device, cause the device to: receive a first set of metrics for a plurality of facilities, the plurality of facilities having a total number of facilities; receive data associated with the first set of metrics from one or more facilities of the plurality of facilities; determine one or more anomalies in the received data; remove the determined one or more anomalies from the received data; select a second set of metrics from the first set of metrics, wherein a number of metrics of the second set is less than a number of metrics of the first set of metrics; and outputs a recommendation applicable to the plurality of facilities based on the second set of metrics.

In any of these embodiments, the plurality of anomalies may be determined by Robust Principal Component Analysis (RPCA).

In any of these embodiments, the one or more anomalies determined by RPCA may be interpreted as a guidance for selecting the second set of metrics.

In any of these embodiments, the one or more programs may include instructions for inserting anomalies into the received data and determining a value of a parameter associated with a protocol, the value configured to enable the protocol to detect the inserted anomalies and select the second set of metrics.

In any of these embodiments, the one or more programs may include instructions for determining an accuracy of the recommendation.

In any of these embodiments, the second set of metrics may be selected by Sparse Principal Component Analysis (SPCA).

In any of these embodiments, the one or more programs may include instructions for computing a variable configured to infer non-selected metrics of the first set of metrics that are not included in the second set of metrics.

In any of these embodiments, the one or more programs may include instructions for inferring the non-selected metrics of the first set of metrics that are not included in the second set of metrics based on the computed variable.

In any of these embodiments, the recommendation may be configured to recommend the second set of metrics for reducing a data processing burden of the received data without appreciable loss of information.

In any of these embodiments, the received data may include one or more of real data and synthetic data.

In any of these embodiments, selection of the second set of metrics may include selection of metrics that are less expensive to measure than non-selected metrics of the first set of metrics, the non-selected metrics are not included in the second set of metrics.

In any of these embodiments, selection of the second set of metrics may include selection of metrics in which a probability of one or more anomalies in the received data associated with the second set of metrics is smaller than a probability of one or more anomalies in the received data associated with the first set of metrics, the non-selected metrics are not included in the second set of metrics.

In any of these embodiments, the recommendation may include guidance, the guidance comprising one or more of: avoiding data points identified to be associated with the one or more anomalies and using the second set of metrics.

In any of these embodiments, the data may be associated with one or more metrics from one or more of Group Practice Reporting Option Features, Consumer Assessment of Healthcare Providers Survey Features, and Electronic Health Record Features.

In any of these embodiments, the data received may associated with the first set of metrics from each facility of the one or more facilities of the plurality of facilities if data from each facility of the plurality of facilities is unavailable.

BRIEF DESCRIPTION OF THE DRAWINGS

The invention will now be described, by way of example only, with reference to the accompanying drawings, in which.

DETAILED DESCRIPTION OF THE DISCLOSURE

Figure 1:
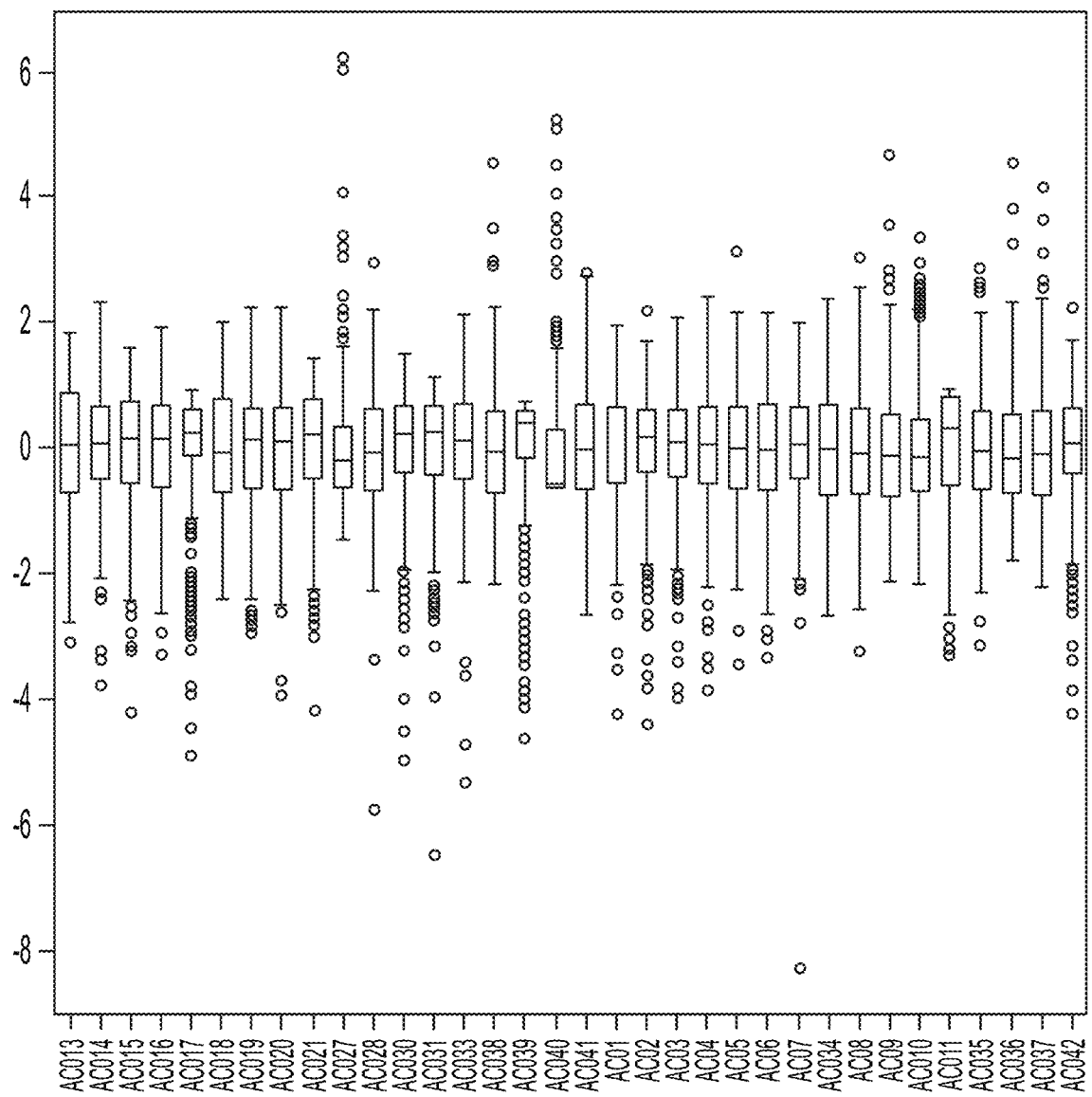
FIG. 1 shows a boxplot visualization of a normalized dataset.

The systems and methods disclosed herein show how modern optimization methods can help reduce metric burdens. In some embodiments, the systems and methods described herein may complement medical and policy judgment when seeking to reduce health metric burdens. For example, the methods described herein recommend a minimum selection of health metrics from a proposed set of candidates when there is reason to expect confounding measurement errors in the data. In particular, empirical examples on synthetic data show that anomalies may be found with no false alarms and a smaller number of metrics that represent the original measurements of the data may be identified without appreciable loss of information.

In some embodiments, the systems and methods disclosed herein may run the original data through a pre-processing protocol followed by Sparse Principal Component Analysis (SPCA) to algorithmically remove anomalies from original data, provide a low-rank approximation of the original data, and recommend a smaller number of metrics associated with the original data based on the original data in the absence of anomalies. This low-rank approximation may provide a pathway to reducing the reporting requirements with minimal adverse impact. In some embodiments, the pre-processing protocol may be Robust Component Analysis (RPCA). In some embodiments, the pre-processing via RPCA may avoid issues described above related to PCA and provide efficient identification of anomalies. This low-rank approximation provides a pathway to reducing the reporting requirements with minimal adverse impact. Described herein are systems and methods configured to handle the burden of data analysis in the presence of redundancies, for example, such as data analysis related to healthcare metrics, transportation metrics, information technology metrics, etc.

In some embodiments, the systems and methods disclosed herein recommend measurement of a smaller set of metrics based on an original set of metrics and its associated data. In some embodiments, if data from all facilities is available, then data received at a system for reducing data burden may include data from all facilities. In some embodiments, if data from all facilities is not available, then the smaller set of metrics may be determined based on one or more facilities of the plurality of facilities. The smaller set of metrics determined based on the one or more facilities may be used to recommend requesting the smaller set of metrics from one or more remaining facilities of the plurality of facilities. Since gathering data for all metrics can be expensive, the systems and methods described herein are configured to recommend a smaller set of metrics for all facilities despite having data from only select facilities. The select facilities may be one or more facilities of the plurality of facilities. For example, if none or a minimal amount of past data is available, some embodiments include receiving data for all the different metrics from a small number of facilities, apply RPCA and then SPCA to it (i.e. train on this smaller data set) to identify the smaller set of metrics and the best way to reconstruct the unmeasured metrics. In some embodiments, data received at a system for reducing data burden may be associated with the one or more facilities of a plurality of facilities if data from each facility of the plurality of facilities is unavailable.

In some embodiments, the systems and methods disclosed herein determine anomalies in data sets associated with an original set of metrics, determine a smaller set of metrics based on the original set of metrics and its associated data that has been processed to remove anomalies, and recommend the smaller set of metrics. In some embodiments, RPCA may be configured to determine anomalies in both real and synthetic data sets. Determining anomalies in synthetic data sets may be configured to provide insight into the accuracy of detecting and removing real anomalies in real data sets. In some embodiments, SPCA may be configured to a selected smaller set of metrics. In some embodiments, removing anomalies first allows for a more effective compression of the original set of metrics in terms of data processing. In some embodiments, once anomalies are identified, the smaller set of metrics may be selected. In some embodiments, from the smaller set of metrics, the non-selected metrics of the original set of metrics may be reconstructed. In some embodiments, if there are no anomalies, the smaller set of the metrics may be a set of columns that form an independent basis for the original set of metrics. In some embodiments, the smaller set of metrics may be a set of columns that concisely accurately represent the original set of metrics. In some embodiments, the smaller set of metrics may be a subset of the original set of metrics. In some embodiments, the smaller set of metrics is based on the computation of the rank of the low rank space. In some embodiments, the systems and methods described herein may be applied to a real-world data set to robustly detect anomalies in testing data, recommend a size of a smaller set of metrics from the testing data that may be less expensively measured than the original set of metrics (or than the non-selected set of metrics of the original set of metrics that are not included in the smaller set of metrics), and may provide guidance regarding information of the smaller set of metrics. In some embodiments, the real-world data may include, for example, healthcare data, transportation data, food and agricultural data, information technology data, housing data. In some embodiments, the guidance may include one or more of guidance to avoid data points identified to be associated with the one or more anomalies and guidance to use the second set of metrics. In some embodiments, the smaller set of metrics may have a lower probability of having one or more anomalies in the received data associated with the second set of metrics compared to a probability of having one or more anomalies in the first set of metrics. In some embodiments, the lower probability of the second set of metrics may be based on the type of measurements that are associated with metrics of the second set of metrics. In some embodiments, the lower probability of the second set of metrics may be based on how measurements associated with metrics of the second set of metrics are collected and recorded at the one or more facilities.

In some embodiments, based on the recommendation associated with the smaller set of metrics, the non-selected metrics of the testing data not included within the smaller set of metrics may be at least partially reproduced using the smaller set of metrics. For example, computation of variable Z may be used to infer the non-selected metrics from the smaller set of metrics. In some embodiments, since the size of the smaller set of metrics is smaller than the original size of the original set of metrics, the data processing burden is reduced through use of the smaller set of metrics without loss of information. In some embodiments, since the smaller set of metrics may be configured to reproduce quite accurately the original measurements of the testing data, there is minimal downside to reducing the data burden. In some embodiments, a perfect reconstruction might not be possible but an extremely good one is feasible and hence the loss of using fewer measurement is minimal.

According to some embodiments, empirical examples on synthetic data show that combining Sparse Principal Component Analysis (SPCA) with RPCA pre-processing may be used to find possible anomalies and correctly determine the minimum metric reporting burden. For example, considering a case of 100 training facilities and 100 testing facilities with 20 metrics each (but for which only 6 would have sufficed)—The combination of SPCA with RPCA correctly identified the minimum metric reporting burden even in the presence of 5 anomalies that were added to the data sets. This was accomplished by using RPCA configured to identify in the training set the smaller dimensional space of the parameters without being distracted by the anomalies present so that subsequent test data set analysis by SPCA could provide an accurate reconstruction of the metrics. In some embodiments, inserting anomalies into a data set can help tune the parameters (i.e. find the parameter a) associated with a protocol (or one or more of the approaches described in reference to algorithms 1-4) and verify that the protocol can successfully identify inserted anomalies and accurately select the smaller set of metrics from the original set of metrics. In some embodiments, the protocol may be any suitable protocol for identifying anomalies and selecting the smaller set of metrics. In some embodiments, the protocol may include one or more of a RPCA-based protocol and a SPCA-based protocol. For example, inserting anomalies into a data set can help tune the parameters of a RPCA-based protocol or RPCA/SPCA-based protocol and verify that the RPCA/SPCA-based protocol as described herein can successfully identify inserted anomalies and select the second set of metrics.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a", "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Approximation methods may be used as implemented in the dimredu python package and available as open source. The Python libraries and Jupyter notebook for generating the results can be found on git@bitbucket.org:rcpaffenroth/dimredu.

Generating and Acquiring Data

According to some embodiments, RPCA can be used to find anomalies in both real and synthetic data sets. Descriptions of exemplary synthetic data and real data is provided below.

Synthetic Data

Creation of synthetic data may rely upon the following variables:
  m: total number of samples
  n: total number of features
  k: number of independent features
  numAnoms: number of anomalies in the data
  sizeAnom: size of each anomaly
  noiseSize: standard deviation of 0-mean Gaussian noise
    added to each element of the matrix Based upon the above variable definitions, a synthetic data matrix X may be created using the following steps
1) Initially, two matrices $A \in R^{m \times k}$ and $B \in R^{k \times n}$ are constructed and a low-rank matrix L is constructed by setting L=AB.
2) An anomaly matrix S of the same size as L is constructed. Each of the entries of S is 0 except for numAnoms entries, selected uniformly at random, which are set to sizeAnoms.
3) A noise matrix N of the same size as L is constructed. Each of the entries of N is set to a random draw from a Gaussian distribution with mean 0 and standard deviation noiseSize.

The final synthetic X matrix may then be constructed as X=L+S+N. In particular, this model is faithful to the assumption that real health data is a combination of low-rank ambient data, i.e., a reduced number of independent metrics and sparse anomalies.

Real Data

The health data set analyzed herein as examples was provided by the Centers for Medicare and Medicaid Services (CMS). The public use file is available at CMS.gov and contains data related to the Shared Savings Program Accountable Care Organizations (ACO) in the year 2016. The dataset consists of 432 ACOs and makes use of 34 nationally recognized Quality Measures. A simple boxplot visualization of the normalized dataset reveals the distributions as shown in FIG. 1, skewed data and outliers of the various features. It is not unusual for real world data to be noisy and impacted by outliers due to human error, but it does complicate analysis.

In some embodiments, metrics may be include a quantification of quality measures. In some embodiments, the quality measures can be divided into subcategories of features.
1) GPRO—Group Practice Reporting Option Features (18 measures in 7 different groups): GPRO features are collected by a web interface which was designed specifically to capture ACO-reported clinical quality data. The 7 groups are: (1) Care Coordination, (2) Coronary Artery Disease, (3) Heart Failure, (4) Hypertension, (5) Ischemic Vascular Disease, (6) Diabetes, and (7) Method Health and preventive care. An example of the 18 measures may include "Preventive Care and Screening": Tobacco Use: Screening and Cessation Information."
2) CAHPS—Consumer Assessment of Healthcare Providers Survey features (8 measures): CAHPS features are collected by a survey administered by a CMS-approved vendor selected and paid for by individual ACOs. The 8 measures are: (1) Getting timely care, appointments and information, (2) How well your providers communicate, (3) Patient's rating of provider, (4) Health promotion and education, (6) Shared decision making, (7) Health Status/Functional status, and (8) Stewardship of patient resources.
3) EHR—Electronic Health Record Features (8 measures): the EHR features is note directly submitted but rather calculated by the CMS ACO PAC based on CMS claims and administrative data extracted from the National Level Repository. The 8 measures are: (1) Risk standardized, All Condition Readmission, (2) Skilled Nursing Facility 30-Day All-Cause Readmission Measures, (3) All-Cause Unplanned Admissions for Patients with Diabetes, (4) All-Cause Unplanned Admissions for Patients with Heart Failure, (5) All-Cause Unplanned Admissions for Patients with Multiple Chronic Conditions, (6) Ambulatory Sensitive Conditions Admissions: Chronic Obstructive Pulmonary Disease or Asthma in Older Adults, (7) Ambulatory Sensitive Conditions Admissions: Heart Failure, and (8) Percent of Primary Care Physicians who Successfully Meet Meaningful Use Requirements.

Experimental Procedure

The following test protocol may be used to compare the following four methods: 1) Using PCA to make predictions from linear combinations of the original metrics as described above in Section A; 2) Using SPCA to make predictions from a subset of the original metrics as described above in Section B; 3) Divide the data into a training set and a test set and apply the RPCA to the training set and use the results to apply PCA to the test set; and 4) Divide the data into a training set and a test set and apply the RPCA to the training set and use the results to apply SPCA to the test set.

Each of these procedures are detailed in the following section.

1) Pure PCA Approach: The pure PCA approach applies Singular Value Decomposition to the training data set to identify the lower-ranked space. It then projects the test data onto that space and labels the difference between the original test data and the projected data as anomalous as indicated in Algorithm 1:

| Algorithm 1 PCA prediction |
| --- |
| 1:   procedure PCA PREDICTION($X_{train}$, $X_{test}$) |
| 2:     Perform PCA to get $U\Sigma V^T$ = SV D($X_{train}$) |
| 3:     Project $X_{test}$ as $L_{test}$ = $X_{test}VV^T$ |
| 4:     Anomalies are $S_{test}$ = $X_{test}$ − $L_{test}$ |
| 5:     return $L_{test}$, $S_{test}$ |

2) Pure SPCA Approach: The pure SPCA approach makes an initial selection of k metrics and selects k columns of the training data and then uses PCA to identify the associated low ranked space. This space is used to find the low ranked part of the test data and hence the anomalies in the test data. This is formally described in Algorithm 2:

| Algorithm 2 SPCA prediction |
| --- |
| 1:   prodeure SPCA PREDICTION($X_{train}$, $X_{test}$) |
| 2:     Make a selection matrix $\mathfrak{S}_{sel}$ |
| 3:     Select k columns of $X_{train}$ to get $X_k = X_{train}\mathfrak{S}_{sel}$ |
| 4:     Perform PCA to get $U\Sigma V^T$ = SV D($X_k$) |
| 5:     Set $Z = X_k(\mathfrak{S}_{sel}^T - \mathfrak{S}_{sel}^T VV^T)((I - \mathfrak{S}_{sel}\mathfrak{S}_{sel}^T)VV^T - (I - \mathfrak{S}_{sel}\mathfrak{S}_{sel}^T))^{-1}$ |
| 6:     Project $X_{test}$ as $L_{test} = X_{test}\mathfrak{S}_{sel}\mathfrak{S}_{sel}^T + Z(I - \mathfrak{S}_{sel}\mathfrak{S}_{sel}^T)$ |
| 7:     Anomalies are $S_{test} = X_{test} - L_{test}$ |
| 8:     return $L_{test}$, $S_{test}$ |

3) PCA with RPCA Preprocessing Approach: Here RPCA is applied to the training data to identify the low ranked space of the training data. Next, PCA is applied to the projection of the test data onto that space to identify the low rank test data and the anomalies in the test data. The RPCA preprocessing step prevents the anomalies in the training data from inducing incorrect errors when processing the test data. This is formally described in Algorithm 3:

| Algorithm 3 PCA prediction with RPCA preprocessing |
| --- |
| 1: procedure PCA PREDICTION($X_{train}$, $X_{test}$) |
| 2:  Perform RPCA to get $L_{train}$, $S_{train}$ = RPCA($X_{train}$) |
| 3:  Perform PCA to get $U\Sigma V^T$ = SV D($L_{train}$) |
| 4:  Project $X_{test}$ as $L_{test}$ = $X_{test} V V^T$ |
| 5:  Anomalies are $S_{test}$ = $X_{test}$ − $L_{test}$ |
| 6:  return $L_{test}$, $S_{test}$ |

4) *SPCA with RPCA Preprocessing Approach:* In a manner similar to the PCA with RPCA preprocessing approach, this approach applies RPCA to the SPCA analysis of the training data to prevent the anomalies in the training data from inducing incorrect errors when processing the test data. This is formally described in Algorithm 4:

| Algorithm 4 SPCA prediction with RPCA preprocessing |
| --- |
| 1: procedure SPCA PREDICTION($X_{train}$, $X_{test}$) |
| 2:  Perform RPCA to get $L_{train}$, $S_{train}$ = RPCA($X_{train}$) |
| 3:  Make a selection matrix $\mathfrak{S}_{sel}$ |
| 4:  Select k columns of $L_{train}$ to get $L_k$ = $L_{train}\mathfrak{S}_{sel}$ |
| 5:  Perform PCA to get $U\Sigma V^T$ = SV D($L_k$) |
| 6:  Set Z = $L_k(\mathfrak{S}_{sel}^T - \mathfrak{S}_{sel}^T VV^T)((I - \mathfrak{S}_{sel}\mathfrak{S}_{sel}^T)VV^T - (I - \mathfrak{S}_{sel}\mathfrak{S}_{sel}^T))^{-1}$ |
| 7:  Project $X_{test}$ as $L_{test}$ = $X_{test}\mathfrak{S}_{sel}\mathfrak{S}_{sel}^T$ + Z(I − $\mathfrak{S}_{sel}\mathfrak{S}_{sel}^T$) |
| 8:  Anomalies are $S_{test}$ = $X_{test}$ − $L_{test}$ |
| 9:  return $L_{test}$, $S_{test}$ |

Results

The following results demonstrate a comparison of the Algorithms 1-4 described above. The algorithms were performed on synthetic data with noise and varying amounts and sizes of anomalies added. The plots reveal that RPCA is able to detect the true rank of the data (which was created to be of rank-6), while PCA has trouble detecting the rank as it is thrown off by the noise and outliers. Additional evidence is provided in the confusion matrix plots which show a significantly better False Positive rate using the RPCA method. Several different types of results are described below.

Table I shows the root mean square error (RMSE) of the four approaches, each implementing one of the four algorithms. As shown in the example of Table I, combining SPCA with RPCA identified that the data burden may be reduced by measuring 6 metrics of the original 20 metrics. The associated mean squared error (MSE) values indicate insignificant loss of the ability to reconstruct the original true metric values (in absence of anomalies) and a small loss of ability to reconstruct the original data in the presence of anomalies. In some embodiments, and as shown in Table II, the combining SPCA with RPCA detected all anomalies.

TABLE I

RMSE error of reconstructions.

| Reconstruction type | Rank | Predictors to measure | RMSE with no anomaly in testing | RMSE with anomaly in testing |
| --- | --- | --- | --- | --- |
| PCA | 9 | 20 | 4.3e−1 | 1.3e0 |
| SPCA | N/A | 6 | 2.3e0 | 4.7e0 |
| PCA with RPCA | 6 | 20 | 5.3e−4 | 1.8e0 |
| SPCA with RPCA | 6 | 6 | 2.7e−3 | 6.3e0 |

Table II compares the F1 score of the four approaches. The F1-score balances false-positives and false-negatives. The best possible score is 1 and the worst possible score is 0. Formally, the F1 Score is the harmonic mean of the precision and the recall. The precision is the number of true positive results divided by the number of true positives plus the number of false positive. The recall is the number of true positives divided by the number of true positives plus the number of false negatives.

TABLE II

F1-score for anomaly detection.

| Reconstruction type | F1-score for anomaly detection |
| --- | --- |
| PCA | 0.23 |
| SPCA | 0.51 |
| PCA with RPCA | 0.97 |
| SPCA with RPCA | 0.99 |

Figure 2:
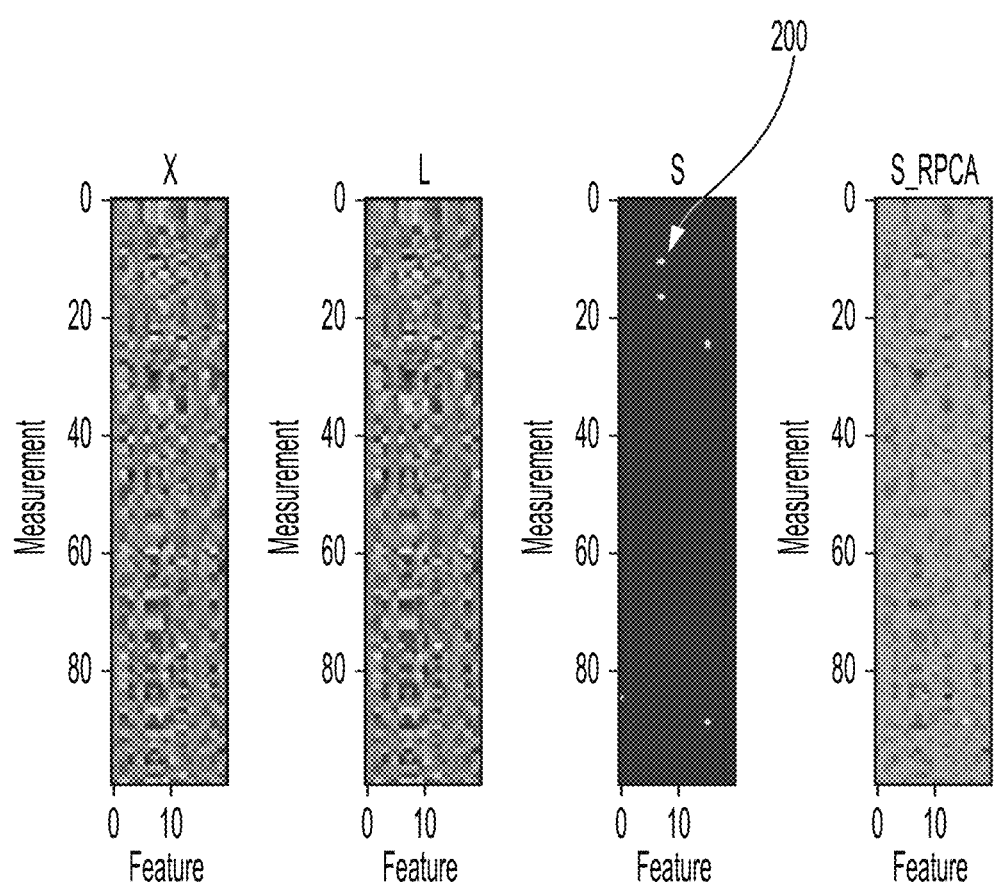
FIG. 2 shows an example of RPCA with 5 anomalies, each of size 0.001.

According to some embodiments, the RPCA algorithm can be used as a pre-processing protocol to determine one or more anomalies of a data set. FIGS. 2-6, show results of the RPCA algorithm running alone across a variety of scenarios highlighting performance of the RPCA algorithm in terms of true anomaly detection without false detections based on a number of anomalies and size of each anomaly. In FIGS. 2-6, the shading maps represents numerical values corresponding to each of the matrices. The shading scales to the numerical values such that the anomalous values which are large relative to the rest of the data are distinguishable from rest of the data of the graphic. In this way, numerical values that are very different from the rest of the data are contrasted against the rest of the data. According to some embodiments, the shading scale can be normalized based on one or more of a spread, a range, or average of numerical values of the data. A smallest numerical value of the data can be represented by a darkest shade of gray and a largest numerical value of the data can be represented by a lightest shade of gray. Numerical values in between the smallest and the largest numerical values can be represented by corresponding shades of gray in between the darkest and lightest shade of gray. For example, in the graphic representing the S matrix in FIG. 2, the most prominent features (represented in light gray) are numerical values that are large relative to the rest of the data and correspond to anomalous values as the rest of the matrix is about 0 (represented in dark gray). That is, the anomalous values are so different from the rest of the data that in order to visually contrast the large anomalous values against the rest of the data, the shading scale is normalized such that the rest of the data is about 0 and represented in dark gray. In the example of FIG. 2, arrow 200 points to one of the most prominent features (represented in light gray) in the graphic. Compared to the graphic representing the S matrix of FIG. 2, the graphic representing the X matrix of FIG. 2 shows that the data does not have as wide a spread of numerical values and that the anomalous values are not that different from the true data. That is, compared to the graphic that represents matrix S of FIG. 2, the shading of the graphic representing matrix X of FIG. 2 does not show as high a contrast to clearly identify the anomalous values against the rest of the data. Therefore, compared to the graphic that represents matrix S of FIG. 2, the anomalous values of the graphic that represents matrix X of FIG. 2 are hard to identify. Further description of FIGS. 2-6 is provided in turn below.

FIG. 2 shows the results of RPCA running alone in the presence of very small anomalies for the training data. In the example of FIG. 2, the training data includes 5 anomalies each of size 0.001. In this parameter range using RPCA alone has difficulty detecting the anomalies since the anomalies are three orders of magnitude smaller than the ambient low-rank background. As a result, the flagged anomalies, displayed in the fourth graphic (S_RPCA graphic), are not present in the data as indicated in the third graphic (S graphic) of true anomalies. Since the fourth and third graphic of FIG. 2 do not match, this indicates that there are falsely detected anomalies when RPCA is applied to training data that includes anomalies each having very small sizes (5 anomalies each of size 0.001). Therefore, RPCA cannot accurately detect true anomalies in training data with 5 anomalies each of size 0.001. However, as shown in the following figures, for anomaly sizes larger than 0.001, such as an anomaly size of 1 (FIG. 3) or an anomaly size of 50 (FIG. 4), RPCA can be used to determine true anomalies without false detections.

Figure 3:
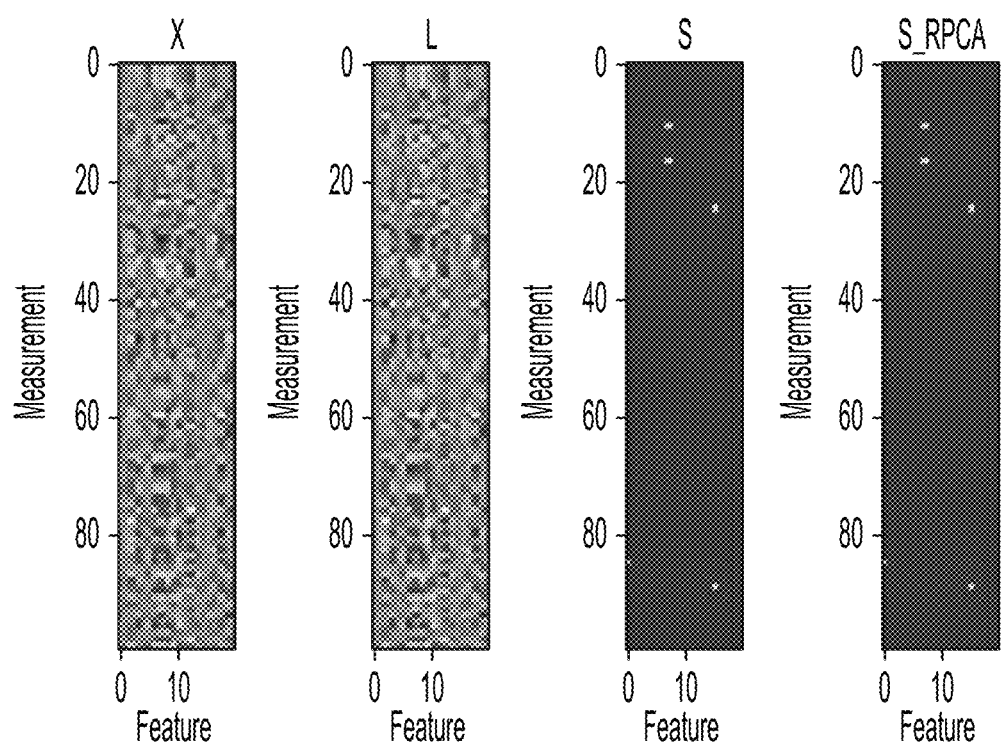
FIG. 3 shows an example of RPCA with 5 anomalies, each of size 1.

FIG. 3 shows RPCA running alone on data with a small number of anomalies of the same order of magnitude as the low-rank background. In the example of FIG. 3, the data includes 5 anomalies each of size 1. In this parameter regime, the third graphic (S graphic displaying true anomalies) and the fourth graphic (S_RPCA graphic displaying anomalies flagged by RPCA) of FIG. 3 are identical indicating that RPCA alone can detect the true anomalies and has no false detections. The ability to detect the true anomalies without false detection in the example of FIG. 3 is enabled by the larger anomaly size relative to the anomaly size in the example of FIG. 2.

Figure 4:
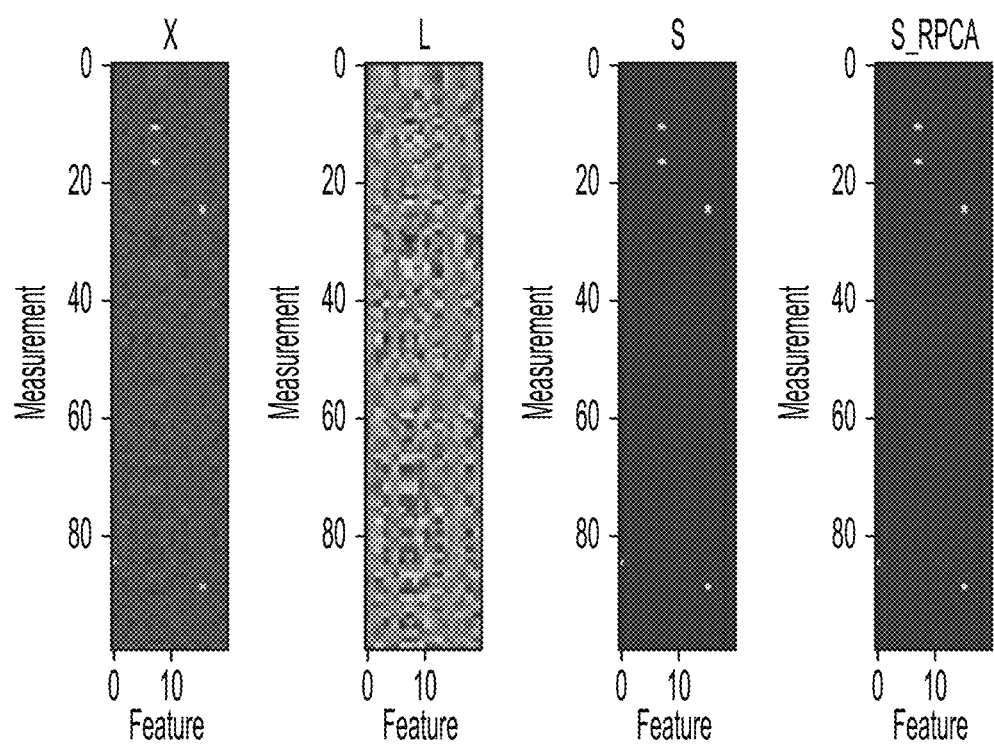
FIG. 4 shows an example of RPCA with 5 anomalies, each of size 50.

FIG. 4 shows some very large anomalies (compared to anomalies of FIGS. 2 and 3), and similar to the example of FIG. 3, running the RPCA alone can detect the true anomalies and has no false detections. In the example of FIG. 4, the data includes 5 anomalies each of size 50. In this parameter regime, the third graphic (S graphic displaying true anomalies) and the fourth graphic (S_RPCA graphic displaying anomalies flagged by RPCA) of FIG. 4 are identical indicating that RPCA alone can detect the true anomalies and has no false detections.

Figure 5:
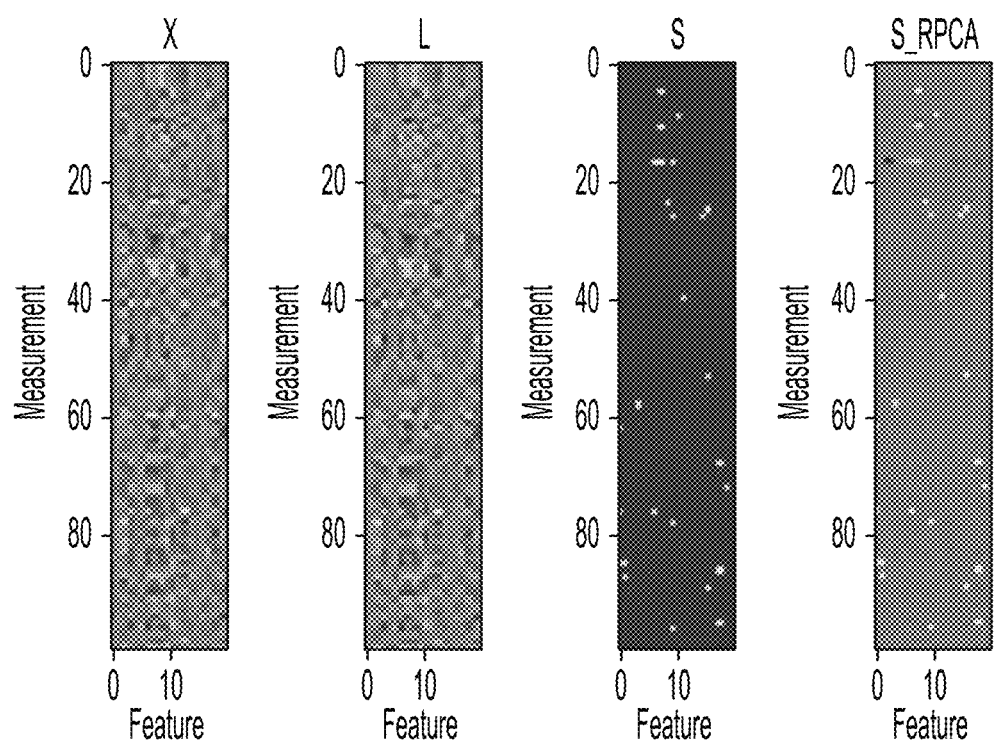
FIG. 5 shows an example of RPCA with 50 anomalies, each of size 0.01.

FIG. 5 displays a hard example with many small anomalies yet running RPCA alone does a good job. In the example of FIG. 5, the data includes 50 anomalies, each of size 0.01. In this parameter regime, the third graphic (S graphic displaying true anomalies) and the fourth graphic (S_RPCA graphic displaying anomalies flagged by RPCA) of FIG. 5 are similar indicating that RPCA alone can detect true anomalies. There are some differences (for example, between measurements 0 to 20 on the y-axis) between the two graphics, however, overall the RPCA algorithm does a good job detecting true anomalies.

Figure 6A:
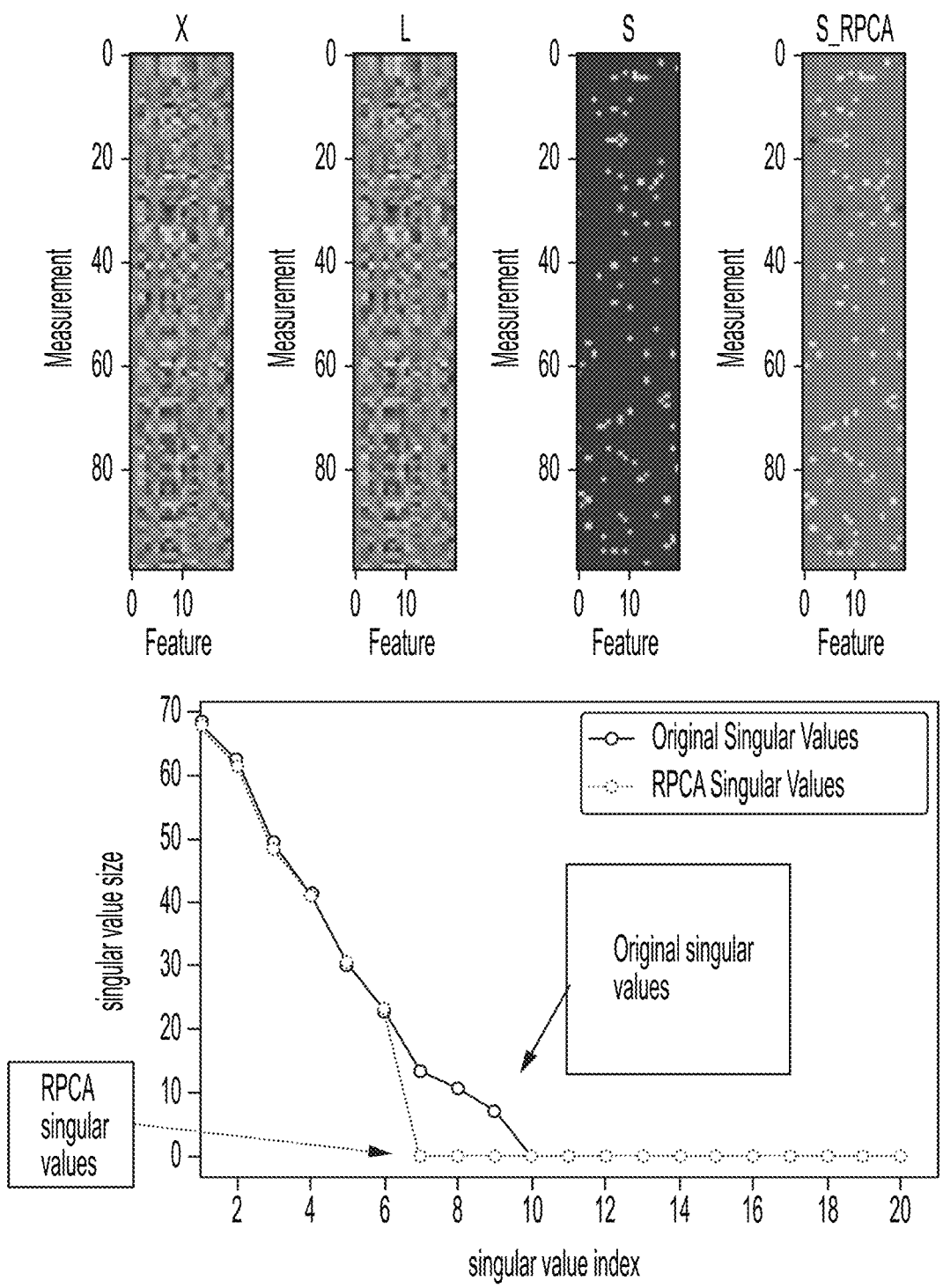
FIG. 6A shows an example of RPCA with 500 anomalies, each of size 0.1.
Figure 6B:
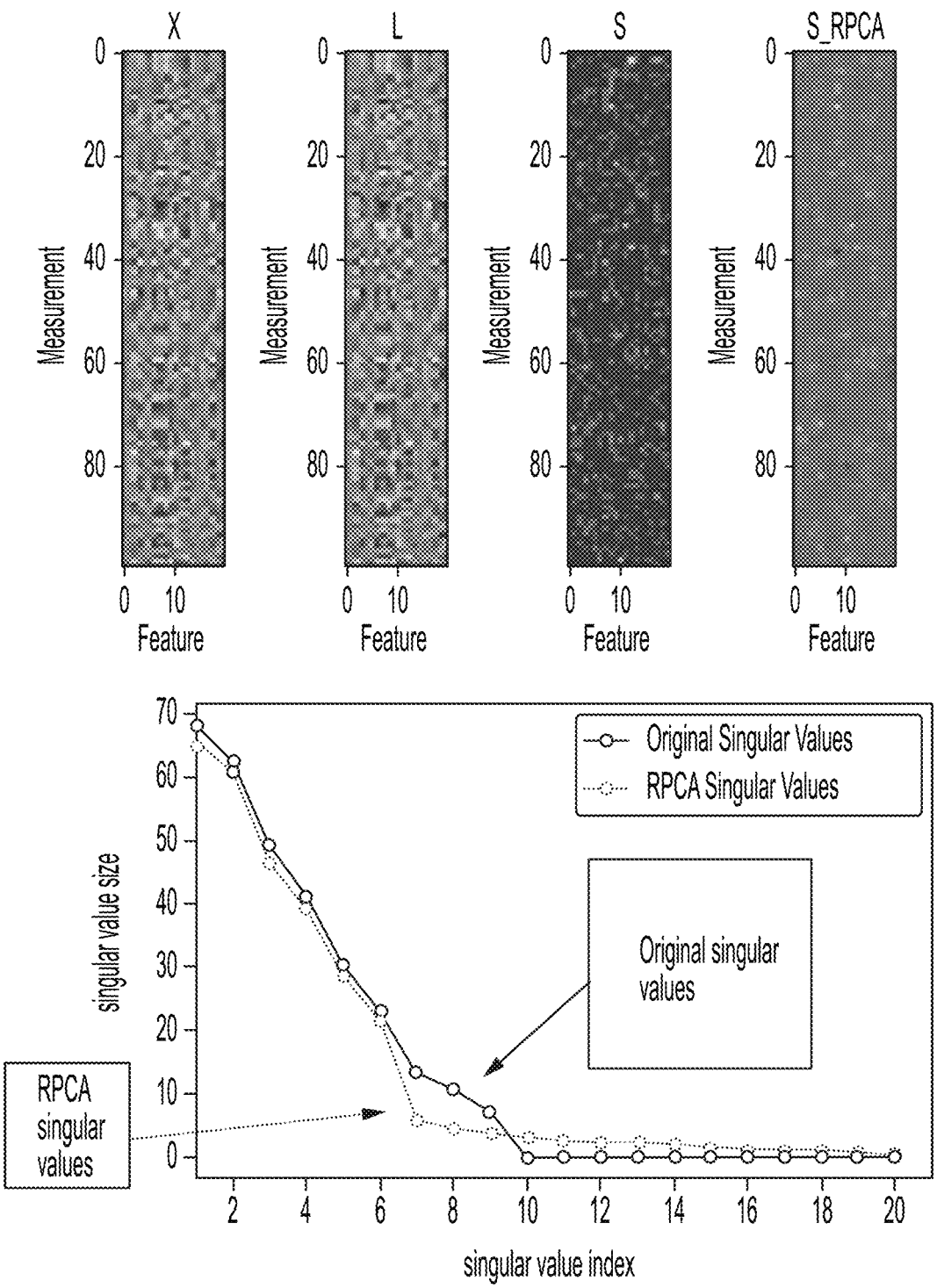
FIG. 6B shows an example of RPCA with 500 anomalies, each of size 1.

FIG. 6 shows the limits of the RPCA in the presence of many anomalies through shading maps (top row of FIGS. 6A and 6B) and scatter-plots (bottom row of FIGS. 6A and 6B). Specifically, FIG. 6A shows an example of RPCA with 500 anomalies each of size 0.1 and FIG. 6B shows an example of RPCA with 500 anomalies each of size 1. In FIG. 6A, the rank is computed correctly as indicated by the RPCA singular values curve, but in FIG. 6B the problem is so difficult that the rank is computed incorrectly. In the scatter-plots of FIGS. 6A and 6B, the singular values plotted are from the SVD. FIG. 6A shows that the matrix is of rank 6 based on RPCA identifying that there are 6 positive singular values. In FIGS. 6A and 6B, the original singular values curve incorrectly shows that the rank is 9 as the original singular values curve has 9 non-zero values. The original singular values were computed by PCA which is not configured to compute singular values in the presence of anomalies. Thus, PCA is unreliable in the presence of anomalies as evident by the incorrect rank shown in FIGS. 6A and 6B as indicated by the original singular values curves. The L matrices used in the graphics of FIGS. 6A and 6B are not the same. This difference is apparent in the RPCA singular value curves shown in the scatterplots of FIGS. 6A and 6B. In the example of FIG. 6B, the RPCA singular values curve indicates 9 positive singular values followed by very small values, whereas FIG. 6A shows 6 positive singular values followed by very small values. Also, the difference is apparent in the original singular values curve using PCA since PCA would have recommended 9 metrics which is an overestimate as the correct number is 6. In contrast to FIG. 2 that showed a limit of the RPCA algorithm in which the RPCA algorithm resulted in various false anomaly detections, FIG. 6B shows another limit of the RPCA algorithm in which the RPCA algorithm resulted in incorrect rank determination due to a large number and size of anomalies.

As discussed above, running PCA, RPCA, and SPCA alone do not individually provide the ability to detect true anomalies in an original data set, reconstruct the original data set, and output a recommendation of a metric set for the original data set that is smaller than an original set of metrics for the original data set. Furthermore, not all combination of these algorithm provide such an ability. FIGS. 7-14 show results from various combinations of these algorithms. Specifically, each figure of FIGS. 7-14 shows a true number of anomalies in a S true graphic (left graphic) and a computed number of anomalies in a S computed graphic (right graphic) in attempt to reconstruct data depicted in the corresponding S true graphic. Fidelity in the reconstruction of the S true graphic (using the indicated algorithms) can be assessed by comparing the S computed graphic with the S true graphic. For example, a number of anomalies indicated by high contrast features (such as anomalies pointed out by arrows of FIG. 11) in the S true graphic and the S computed graphic can be compared to assess whether the S computed graphic includes the same number of anomalies as the S true graphic. According to some embodiments, one or more of the anomalies indicated in the S true and S computed graphics may describe a major departure from what a low-rank model would have predicted for a given data set. According to other embodiments, one or more of the anomalies indicated in the S true and S computed graphics may also include a small collection of data points of a data set which can have potentially very large errors. In either embodiment, removal of such anomalies in the S computed graphics can reduce size of a data set, a data collection burden associated with the data set, improve data accuracy, or a combination thereof.

Figure 12:
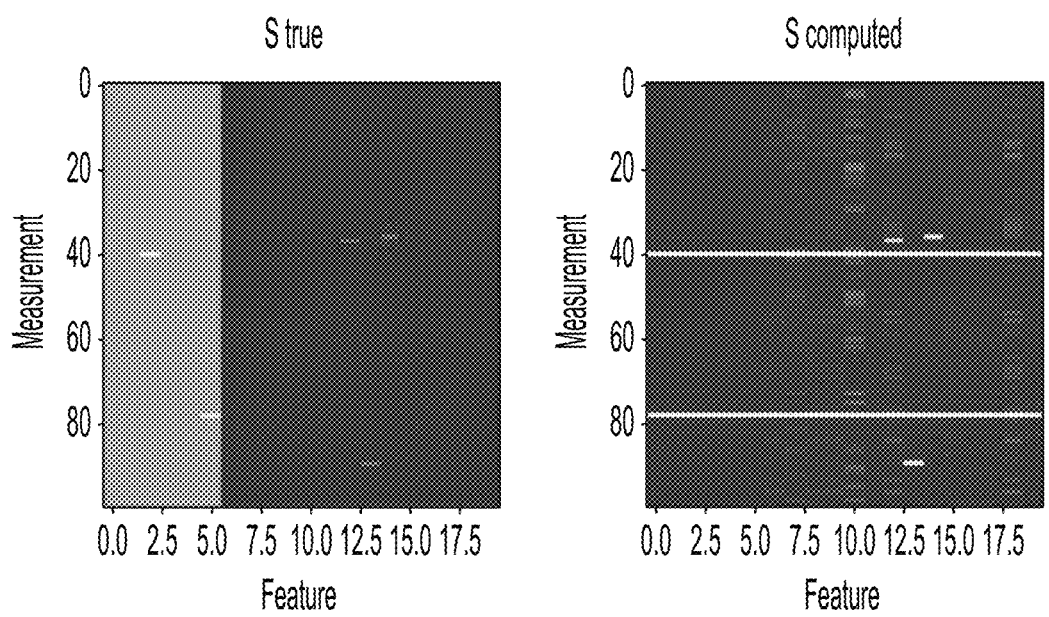
FIG. 12 shows an example of SPCA prediction without RPCA first. Errors caused by anomalies in the training data emphasized.
Figure 13:
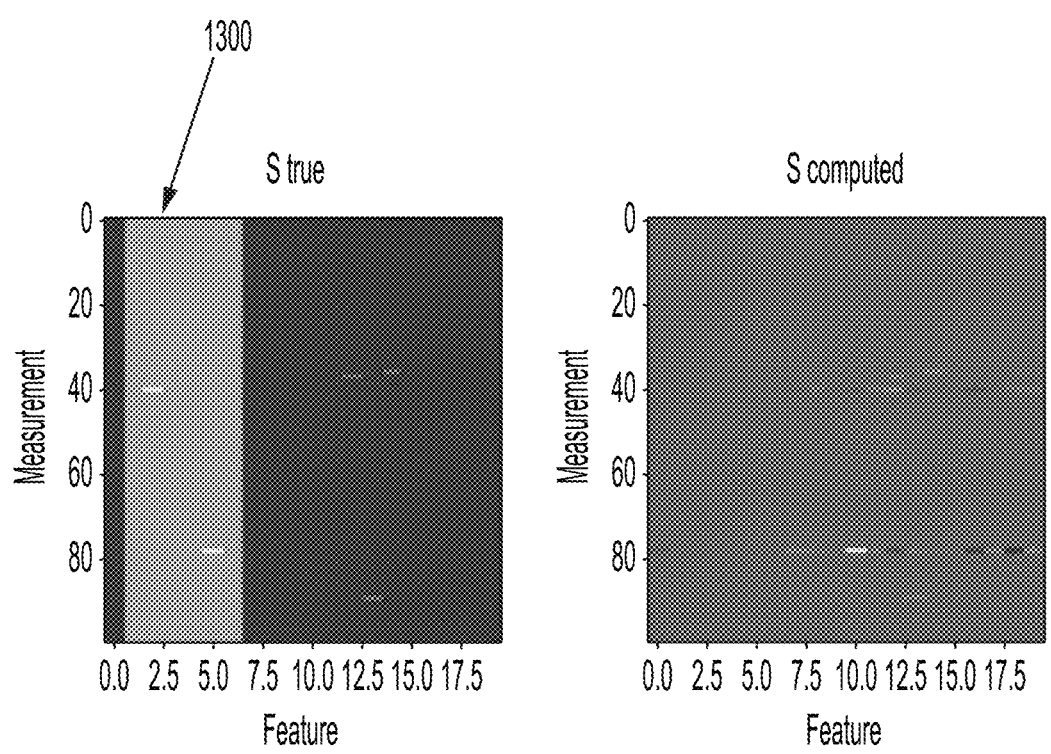
FIG. 13 shows an example of SPCA prediction with RPCA first.
Figure 14:
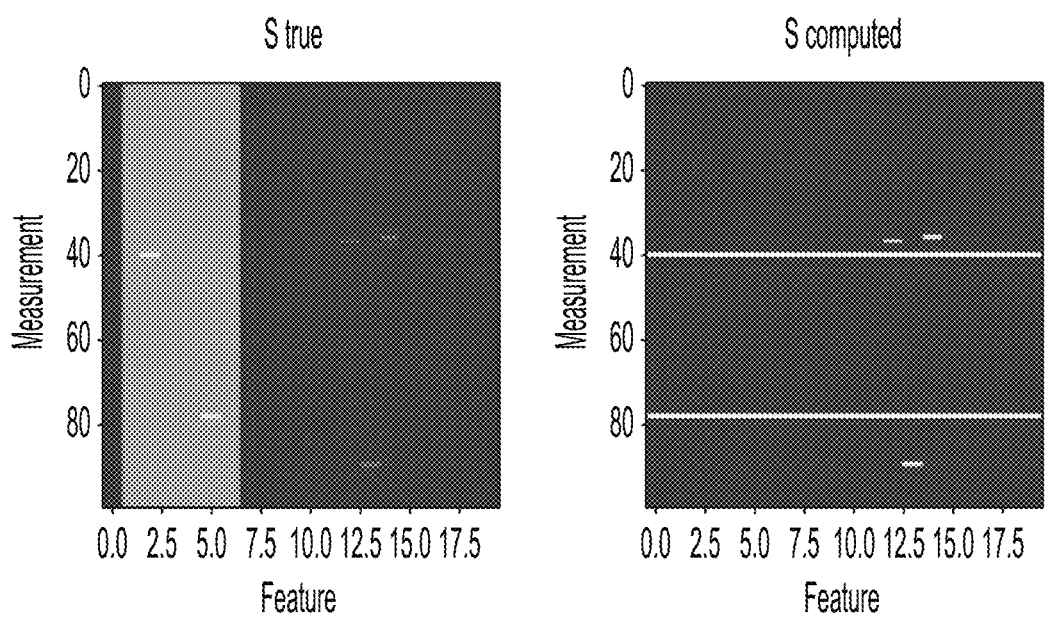
FIG. 14 shows an example of SPCA prediction with RPCA first.

The S computed graphic can be generated based on either a purely PCA prediction without RPCA first (FIGS. 7 and 8), PCA prediction with RPCA first (FIGS. 9 and 10), a SPCA prediction without RPCA processing first (FIGS. 11 and 12), or a SPCA prediction after an RPCA preprocessing (FIGS. 13 and 14). Specifically, FIGS. 7, 9, 11, and 13 show S true graphics with one or more anomalies and corresponding S computed graphics that attempt to detect the one or more anomalies and in some cases include reconstruction errors. According to some embodiments, one or more anomalies in the data may cause row and/or column errors in reconstruction of the data. To arrive at a more accurate reconstruction without or with minimal errors, errors were removed to reconstruct data shown in the S computed graphics in FIGS. 8, 10, 12, and 14. Below is a further description of the reconstruction errors and FIGS. 7-14.

Figure 7:
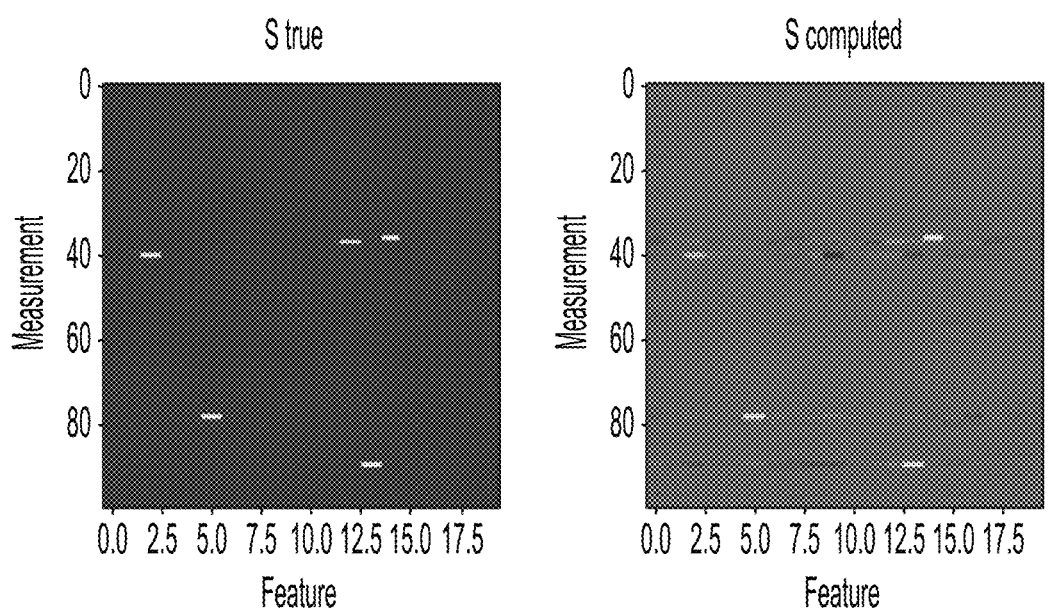
FIG. 7 shows a PCA prediction without RPCA first.

FIG. 7 shows a purely PCA based prediction without RPCA first. Besides requiring all of the original metrics to compute, the anomalies in the training and testing data may cause many errors in reconstruction in both the rows and the columns. The training data may be used to determine a rank and for a selected number of metrics, determine G. The testing data may be a different set of data, different from the training data, used for applying what was learned with the training data and for quantifying how well the protocol (for example PCA, RPCA, SPCA, or RPCA+SPCA) does given a different set of data. The left graphic of FIG. 7 (S true) shows true anomalies in the data. The errors in the columns right graphic (S computed) may be caused by anomalies in the training data set which are unknown to the PCA algorithm and therefore create errors in the test data reconstruction. The errors in the rows of the right graphic (S computed) may be caused by anomalies in the test data which are unknown to the PCA algorithm and therefore used to incorrectly reconstruct the test data. These errors may be unavoidable in the purely PCA based prediction and are indicated in FIG. 7 by the different color shades (such as in rows around measurement 40, around measurement 80, and around measurement 90, in columns around feature 7.5 and around feature 15). Therefore, FIG. 7 shows that application of a purely PCA prediction without RPCA first to data that includes anomalies results in row and column errors in the reconstruction of the data (illustrated by the S computed graphic).

Figure 8:
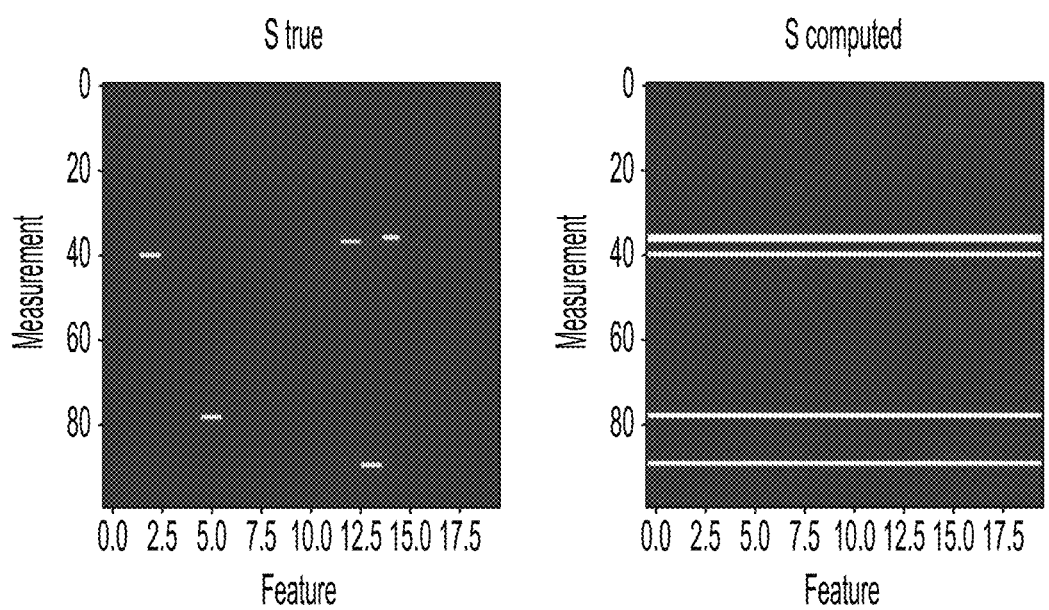
FIG. 8 shows a PCA prediction without RPCA first. Errors caused by test data anomalies emphasized.

FIG. 8 shows the PCA prediction without RPCA first of FIG. 7, but with the rows that correspond to the errors shown in FIG. 7 removed. Specifically, the errors of the S computed graphic of FIG. 7 caused by test data anomalies shown in the S true graphic of FIG. 7 are emphasized in the S computed graphic of FIG. 8 by showing that removal of such errors results in a graphic that includes four data voids (represented by white rows) of various thicknesses. Despite removal of these reconstruction errors, the S computed graphic of FIG. 8 is not accurate in its reconstruction of the data since it includes column errors (for example, light contrasted regions around feature 7.5 and around feature 15) and does not recover the true anomalies shown in the S true graphic of FIG. 8.

Figure 9:
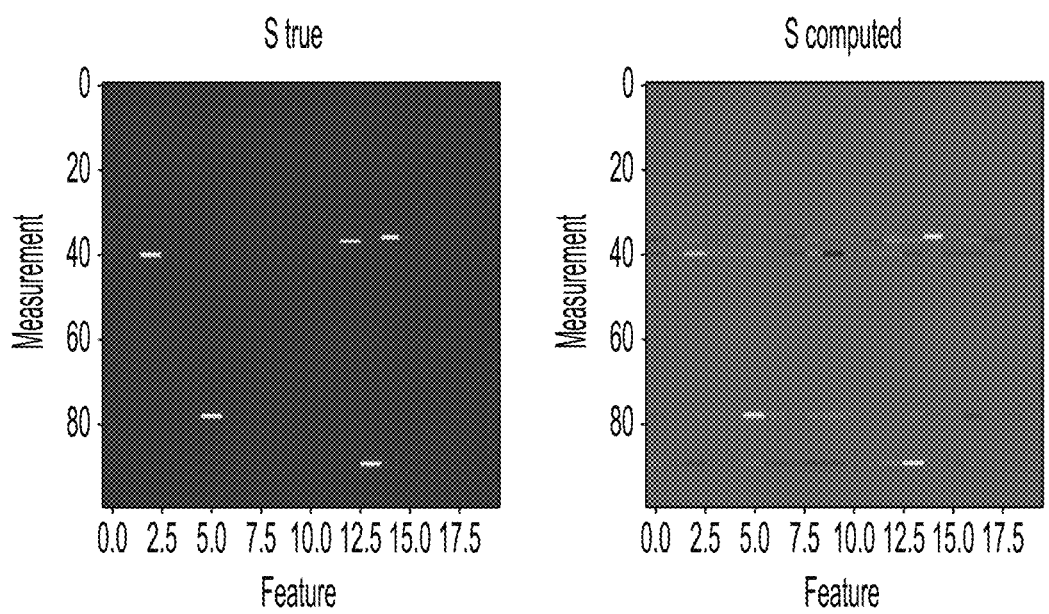
FIG. 9 shows an example of PCA prediction with RPCA first.
Figure 10:
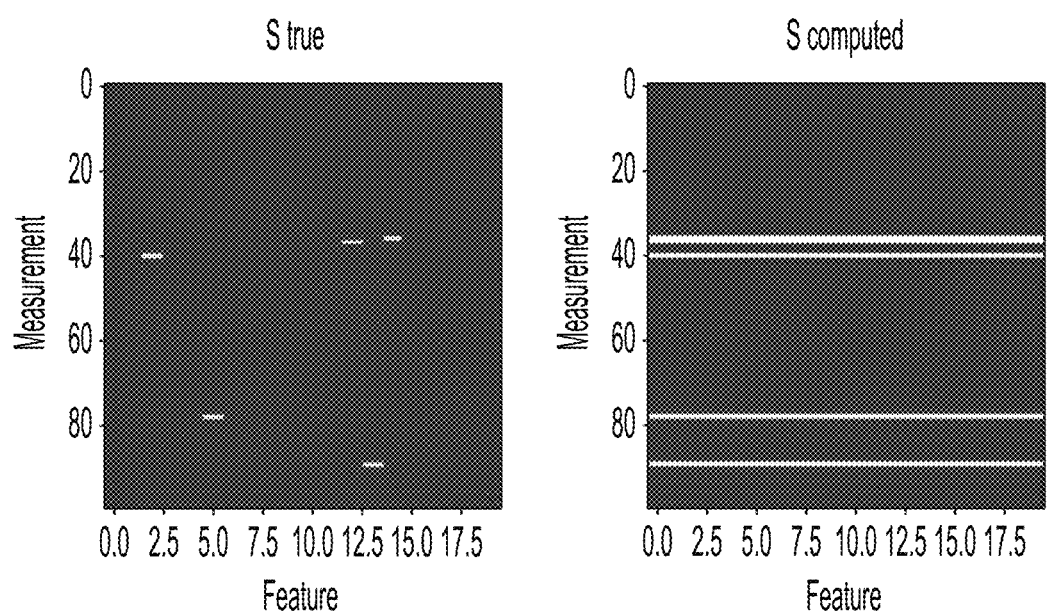
FIG. 10 shows an example of PCA with RPCA first. Errors caused by training data emphasized.

FIGS. 9 and 10 show how processing the training data with the PCA prediction with RPCA first may eliminate the reconstruction errors in some columns leaving only unavoidable reconstruction errors in rows of the test data with anomalies. For example, compared to the S computed graphic of FIG. 7, the S computed graphic of FIG. 9 does not include some of the column errors (such as light contrasted regions around feature 7.5 and around feature 15) shown in FIG. 7. Thus, in regards to the column errors, the reconstruction shown in FIG. 9 is more accurate than the reconstruction shown in FIG. 7. However, unavoidable row errors (such as light contrast regions around measurement 40, around measurement 80, and around measurement 90 of FIG. 9) caused by anomalies in the training data are shown in the S computed graphic of FIG. 9. FIG. 10 emphasizes a size and impact of these row errors by showing that removal of these errors result in a S computed graphic that includes four data voids (represented by white rows) of various thicknesses dependent on error size. Despite removal of these reconstruction errors, the S computed graphic of FIG. 10 is not accurate in its reconstruction of the data since it does not recover the true anomalies shown in the S true graphic of FIG. 10.

Figure 11:
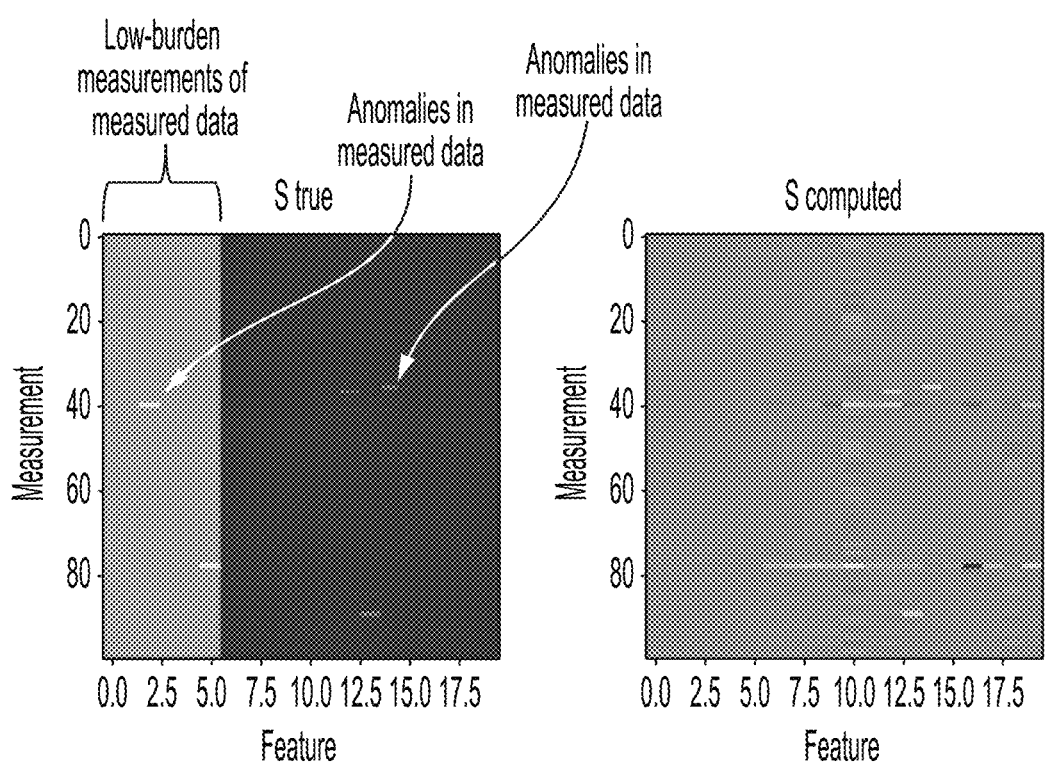
FIG. 11 shows an example of SPCA prediction without RPCA first.

According to some embodiments, reconstruction errors may be found in columns caused by anomalies in the training data and rows if there are anomalies in the training data metrics which were used. Note that SPCA, unlike PCA, uses only some of the metrics in the test data for reconstruction, which are represented by an intermediate shade of gray, for example the intermediate shade of gray described as low-burden measurements of measured data in FIG. 11. The use of a subset reduces induced reconstruction errors. FIGS. 11 and 12 show a SPCA prediction without RPCA processing first. Similar to the example of FIG. 7, the example of FIG. 11 shows errors row and column reconstruction errors. In FIG. 11, the errors caused by anomalies in the training data are shown in the S computed graphic of FIG. 11 as lighter contrasted rows and columns of the S computed graphic that are not included in S true graphic of FIG. 11. A size and impact of these errors on data reconstruction is emphasized in FIG. 12 by showing that removal of these errors result in a S computed graphic that shows two data voids (represented by white rows) of various thicknesses dependent on error size. Despite removal of these reconstruction errors and recovery of the true anomalies shown in the S true graphic of FIG. 12, the S computed graphic of FIG. 12 is not accurate in its reconstruction of the data since includes column errors (such as around feature 10 and around feature 17.5) that are not present in the S true graphic of FIG. 12.

Finally, FIGS. 13 and 14 show an SPCA prediction after an RPCA preprocessing, according to some embodiments. Similar to PCA with RPCA (FIGS. 9 and 10), there may be incorrect rows in data reconstruction due to anomalies in the testing data for SPCA prediction with RPCA first. Such incorrect rows are illustrated in the S computed graphic of FIG. 13. However, in the case of an SPCA prediction with RPCA first, as shown in the S computed graphic of FIG. 14, removal of incorrect rows recovers both the low-rank background and the true anomalies shown in the S true graphic of FIG. 14 up to the error arising in the RPCA optimization for the rows of the test data which do not use anomalous metrics (represented by an intermediate shade of gray as indicated by arrow 1300).

Therefore, FIGS. 13 and 14 support that an SPCA prediction after an RPCA pre-processing can accomplish all three tasks (anomaly detection, correctly computing the number of required metrics, and reconstructing the complete data set). For example, compared to the S computed graphics of FIGS. 7, 9, and 11, the S computed graphic of FIG. 13 shows less (or negligent) row and column reconstruction errors and recovers the true anomalies illustrated to the right of the region pointed out by arrow 1300 in the S true graphic. Furthermore, the S computed graphic of FIG. 14 shows that removal of the reconstruction errors shown in the S computed graphic of FIG. 13 recovers the true anomalies. That is, the S computed graphic of FIG. 14 shows that the data set shown in the S true graphic of FIG. 14 can be completely reconstructed. According to some embodiments, a combination of correct anomaly detection and complete reconstruction of the data set from an SPCA prediction with RPCA first (as shown in FIGS. 13 and 14) can be interpreted as a guidance regarding which metrics of the first set of metrics to select for the second set of metrics.

Figure 15:
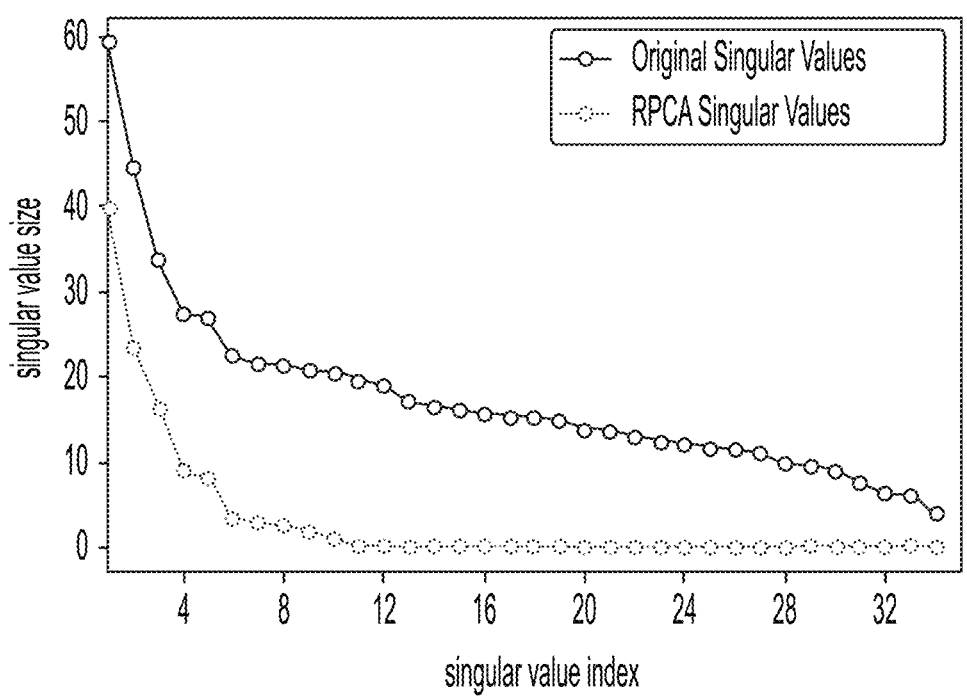
FIG. 15 shows an example of RPCA analysis on real data.
Figure 16:
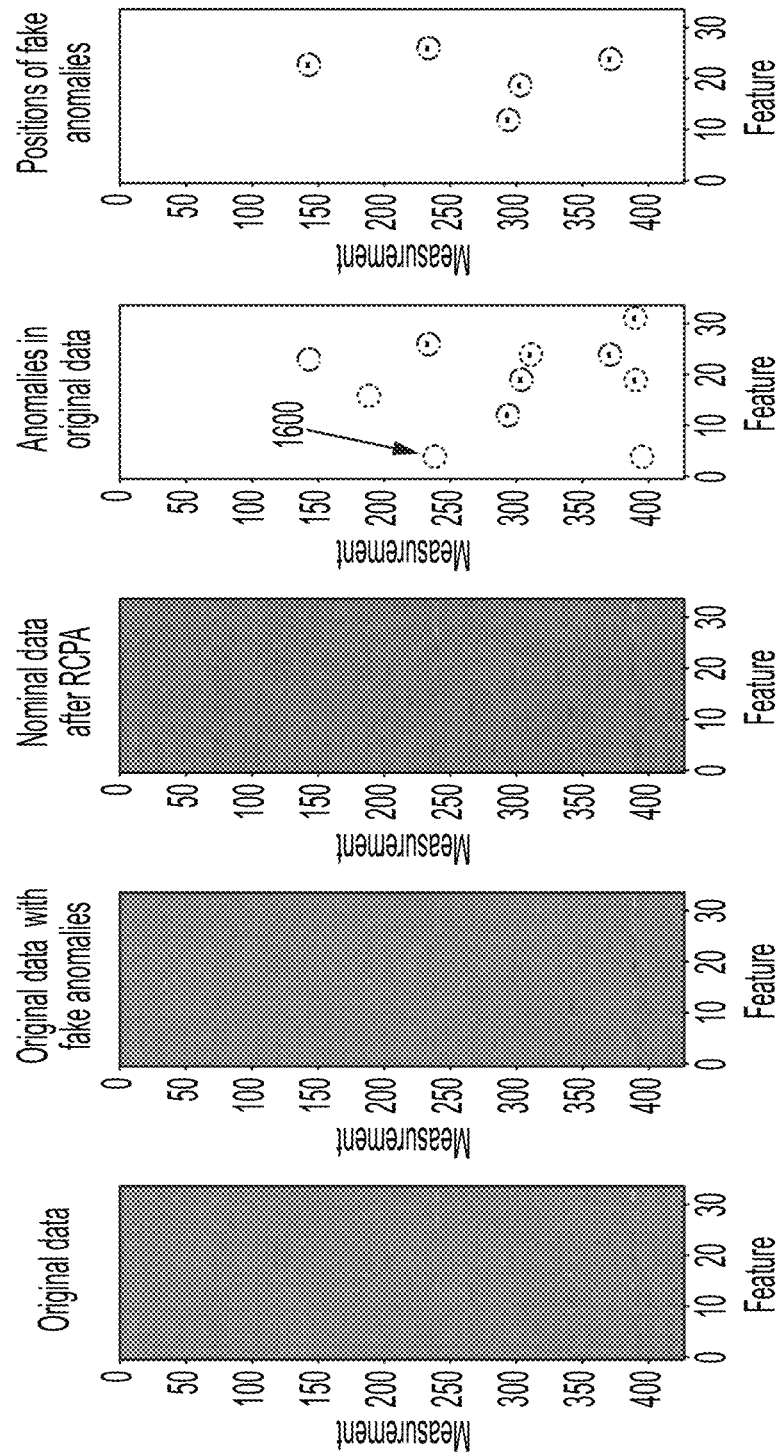
FIG. 16 shows an example of RPCA analysis on real data.

RPCA may alone be a starting point for identifying which metrics may be less reliable than other and should therefore be avoided. However, RPCA combined with SPCA as described herein is configured to select specific metrics to be included in the smaller set of metrics and to quantify the accuracy of detecting real anomalies. FIGS. 15 and 16 show the results of RPCA analysis on real healthcare provided data, according to some embodiments. In the example of FIG. 15, the original singular values curve corresponds to the singular values computed if PCA only were applied to the data and the RPCA singular values curve corresponds to the singular values computed after RPCA processing. The example of FIG. 15 uses $\lambda=0.9/\text{sqrt}(\max (m,n))$ to emphasize the low-rank structure. FIG. 15 shows that the (approximate) rank of the real-world data is 10. Accordingly, one could imagine reaping the benefits of having access to all 34 health-care metrics, within some prescribed error, by just measuring 10 healthcare metrics, with the commensurate saving on the burden of data gathering. That is, the rank of the matrix X correlates to the number of measures that can be used to inform all measures within matrix X. In addition, since it is unknown where the true anomalies, if any occur, the RPCA analysis may be tested by inserting anomalies. A value of the k parameter may be configured to optimize RPCA to detect real anomalies. A value of the k parameter may be configured to optimize RPCA to detect inserted anomalies. In some embodiments, an accuracy of finding inserted anomalies may be determined after determining a k parameter that if configured so that RPCA is capable of detecting the inserted anomalies. In some embodiments, the accuracy of finding inserted anomalies may be associated with an accuracy of a recommendation to use the metrics selected for the second set of metrics.

In some embodiments, the k parameter may be tuned to the largest value for which these anomalies may be detected in S. Note, the real-world data may be noisier and smaller than typical dataset in which RPCA can be applied. However, it can be observed that RPCA does provide useful insights into the data even in this domain despite use of different k values for rank and anomaly detection. It may be observed that the systems and methods described herein exactly detect inserted anomalies perfectly and, as such, makes the other detected anomalies, by way of their presence in the S matrix, highly suspect and worthy of further investigation. The inserted abnormalities may give confidence that the anomalies which the approach finds that are not inserted anomalies are probably true anomalies. Therefore, the insertion of abnormalities may be used to gain insight into the accuracy of detecting real anomalies.

FIG. 16 shows anomalies in the real data. In the example of FIG. 16, anomalies were added and the smallest k value was chosen such that the added anomalies were recovered (as evident by comparing the fourth and fifth graphics of FIG. 16). Dashed circles as indicated by arrow 1600 represent anomalies in the actual data. In the example of FIG. 16, $\lambda=6.0/\text{sqrt}(\max(m,n))$ to emphasize anomalies. Specifically, the columns of FIG. 16 can be translated to indicate that the following features had anomalies:

"Depression Remission at 12 months"
GPRO: "Preventive Care and Screening": Tobacco Use: Screening and Cessation Information"
CAHPS: "Health Status/Functional status"
"CAHPS: Getting Timely Care, Appointments and Information"
EHR: "All-Cause Unplanned Admissions for Patients with Diabetes"

Based on the data, these features should be avoided as required metrics, since in this example, they have been identified as anomalous. An interpretation of the metrics identified as anomalous may be statistically unreliable.

Figure 17:
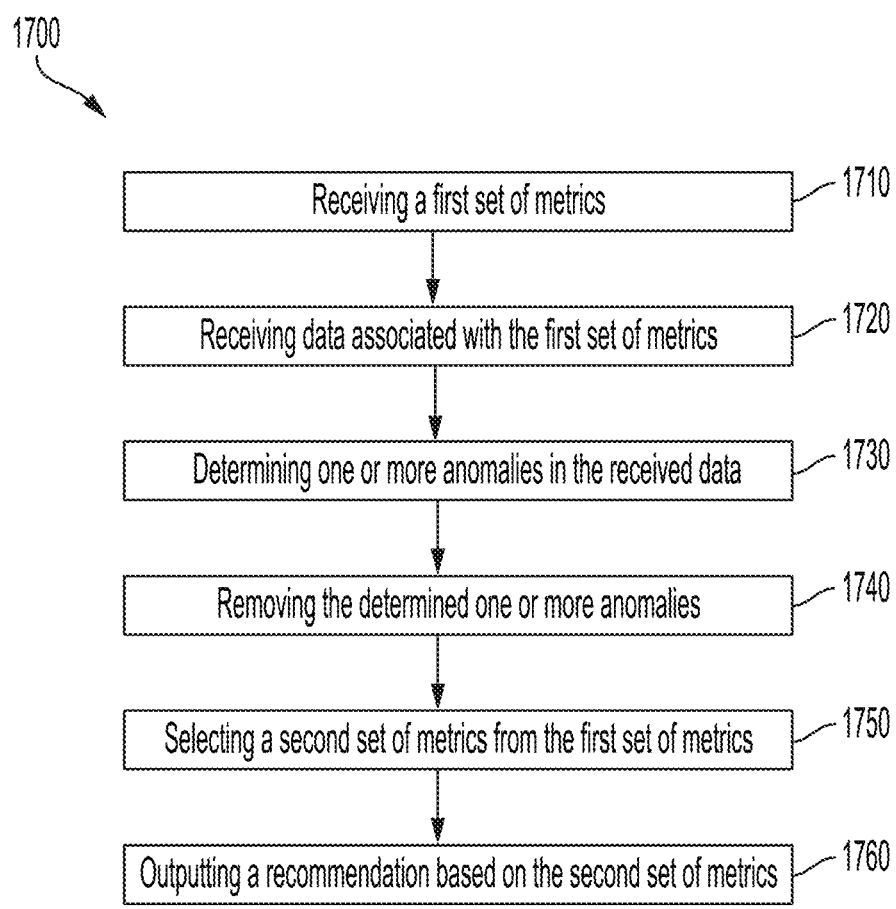
FIG. 17 shows a flowchart demonstrating a method for reducing a data processing burden.

FIG. 17 is a flowchart demonstrating a method 1700 for reducing a data processing burden of a dataset, according to some embodiments. At step 1710, a first set of metrics may be received. In some embodiments, the first set of metrics may be determined from data associated with the first set of metrics. At step 1720, data associated with the first set of metrics may be received. At step 1730, one or more anomalies in the first set of metrics may be determined. The one or more anomalies may affect data processing efficiency of the first set of metrics and data associated with the first set of metrics. At step 1740, the one or more anomalies may be identified and removed from the first set of metrics. At step 1750, a second set of metrics based on the first set of metrics may be selected. In some embodiments, the second set of metrics may serve as a mathematically independent basis for the second dataset. In some embodiments, the second set of metrics may be a set of columns that concisely represent the first set of metrics. In some embodiments, a number of metrics of the second set of metrics may be less than a number of metrics of the first set of metrics. At step 1760, a recommendation based on the second set of metrics may be outputted.

Figure 18:
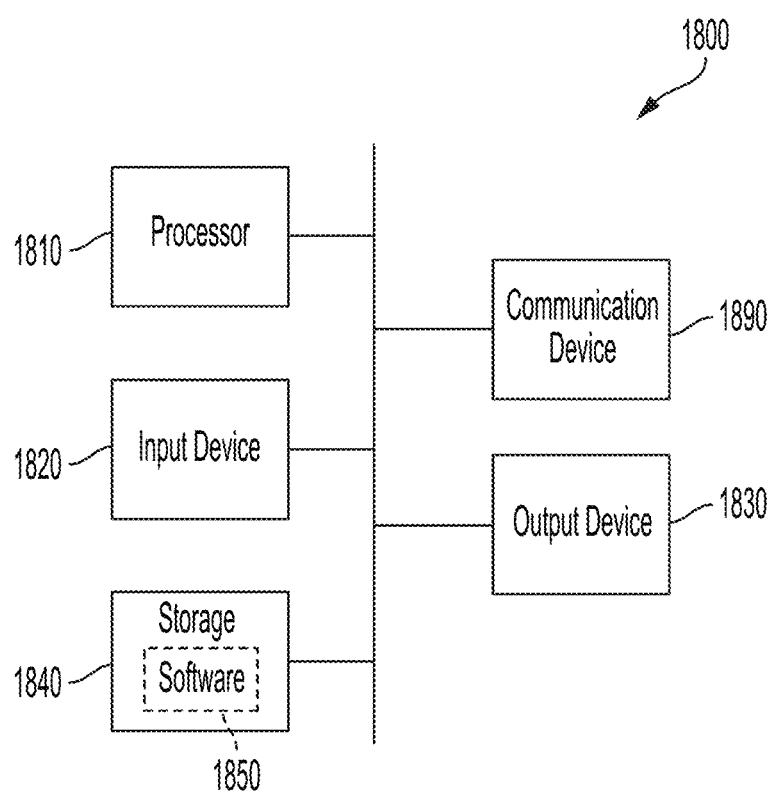
FIG. 18 shows an example of a computing device according to examples of the disclosure.

FIG. 18 illustrates an example of a computing device 1800 in accordance with some embodiments (such as systems described herein) or a computing device for implementing method 700). Device 1800 can be a host computer connected to a network. Device 1800 can be a client computer or a server. As shown in FIG. 18, device 1800 can be any suitable type of microprocessor-based device, such as a personal computer, workstation, server, or handheld computing device (portable electronic device) such as a phone or tablet. The device can include, for example, one or more of processor 1810, input device 1820, output device 1830, storage 1840, and communication device 1860. Input device 1820 and output device 1830 can generally correspond to those described above and can either be connectable or integrated with the computer.

Input device 1820 can be any suitable device that provides input, such as a touch screen, keyboard or keypad, mouse, or voice-recognition device. Output device 1830 can be any suitable device that provides output, such as a touch screen, haptics device, or speaker.

Storage 1840 can be any suitable device that provides storage, such as an electrical, magnetic, or optical memory including a RAM, cache, hard drive, or removable storage disk. Communication device 1860 can include any suitable device capable of transmitting and receiving signals over a network, such as a network interface chip or device. The components of the computer can be connected in any suitable manner, such as via a physical bus or wirelessly.

Software 1850, which can be stored in storage 1840 and executed by processor 610, can include, for example, the programming that embodies the functionality of the present disclosure (e.g., as embodied in the devices as described above).

Software 1850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1840, that can contain or store programming for use by or in connection with an instruction execution system, apparatus, or device.

Software 1850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic, or infrared wired or wireless propagation medium.

Device 1800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1800 can implement any operating system suitable for operating on the network. Software 1850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for reducing data collection burden, comprising:
    one or more processors;
    memory;
    one or more programs configured for execution by the one or more processors, the one or more programs including instructions for:
        receiving a first set of metrics for at least one facility;
        receiving data associated with the first set of metrics from a facility of the at least one facility;
        determining one or more anomalies in the received data;
        selecting a second set of metrics from the first set of metrics based on the one or more anomalies, wherein a number of metrics of the second set is less than a number of metrics of the first set of metrics;
        reconstructing the non-selected metrics of the first set of metrics based on the second set of metrics; and
        outputting a recommendation that the facility measure the second set of metrics to reduce the data collection burden.

2. The system of claim 1, wherein the first set of metrics is for a plurality of facilities, and wherein the recommendation is applicable to the plurality of facilities.

3. The system of claim 1, wherein the one or more anomalies are determined by Robust Principal Component Analysis (RPCA).

4. The system of claim 3, wherein the one or more anomalies determined by RPCA are interpreted as a guidance for selecting the second set of metrics.

5. The system of claim 1, wherein the one or more programs includes instructions for inserting anomalies into the received data and determining a value of a parameter associated with a protocol, the value configured to enable the protocol to detect the inserted anomalies and select the second set of metrics.

6. The system of claim 1, wherein the one or more programs includes instructions for determining an accuracy of the recommendation.

7. The system of claim 1, wherein the second set of metrics is selected by Sparse Principal Component Analysis (SPCA).

8. The system of claim 1, wherein reconstructing the non-selected metrics of the first set of metrics comprises computing a variable configured to infer the non-selected metrics of the first set of metrics.

9. The system of claim 8, wherein reconstructing the non-selected metrics of the first set of metrics further comprises inferring the non-selected metrics of the first set of metrics based on the computed variable.

10. The system of claim 1, wherein the recommendation that the facility measure the second set of metrics reduces a data processing burden of the received data without appreciable loss of information.

11. The system of claim 1, wherein the received data includes one or more of real data and synthetic data.

12. The system of claim 1, wherein selecting the second set of metrics includes selecting metrics from the first set of metrics that are less expensive to measure than non-selected metrics of the first set of metrics, the non-selected metrics are not included in the second set of metrics.

13. The system of claim 1, wherein selecting the second set of metrics includes selecting metrics in which a probability of one or more anomalies in the received data associated with the second set of metrics is smaller than a probability of one or more anomalies in the received data associated with the first set of metrics, the non-selected metrics are not included in the second set of metrics.

14. The system of claim 1, wherein the recommendation includes guidance, the guidance comprising one or more of: avoiding data points identified to be associated with the one or more anomalies and using the second set of metrics.

15. The system of claim 1, wherein the data is associated with one or more metrics from one or more of Group Practice Reporting Option Features, Consumer Assessment of Healthcare Providers Survey Features, and Electronic Health Record Features.

16. A method for reducing data collection burden, comprising:
receiving a first set of metrics for at least one facility;
receiving data associated with the first set of metrics from a facility of the at least one facility;
determining one or more anomalies in the received data;
selecting a second set of metrics from the first set of metrics based on the one or more anomalies, wherein a number of metrics of the second set is less than a number of metrics of the first set of metrics;
reconstructing the non-selected metrics of the first set of metrics based on the second set of metrics; and
outputting a recommendation that the facility measure the second set of metrics to reduce the data collection burden.

17. The method of claim 16, wherein the first set of metrics is for a plurality of facilities, and wherein the recommendation is applicable to the plurality of facilities.

18. The method of claim 16, wherein the one or more anomalies are determined by Robust Principal Component Analysis (RPCA).

19. The method of claim 18, wherein the one or more anomalies determined by RPCA are interpreted as a guidance for selecting the second set of metrics.

20. The method of claim 16, comprising inserting anomalies into the received data and determining a value of a parameter associated with a protocol, the value configured to enable the protocol to detect the inserted anomalies and select the second set of metrics.

21. The method of claim 16, comprising determining an accuracy of the recommendation.

22. The method of claim 16, wherein the second set of metrics is selected by Sparse Principal Component Analysis (SPCA).

23. The method of claim 16, wherein reconstructing the non-selected metrics of the first set of metrics comprises computing a variable configured to infer the non-selected metrics of the first set of metrics.

24. The method of claim 23, wherein reconstructing the non-selected metrics of the first set of metrics further comprises inferring the non-selected metrics of the first set of metrics based on the computed variable.

25. The method of claim 16, wherein the recommendation that the facility measure the second set of metrics reduces a data processing burden of the received data without appreciable loss of information.

26. The method of claim 16, wherein the received data includes one or more of real data and synthetic data.

27. The method of claim 16, wherein selecting the second set of metrics includes selecting metrics that are less expensive to measure than non-selected metrics of the first set of metrics, the non-selected metrics are not included in the second set of metrics.

28. The method of claim 16, wherein selecting the second set of metrics includes selecting metrics in which a probability of one or more anomalies in the received data associated with the second set of metrics is smaller than a probability of one or more anomalies in the received data associated with the first set of metrics, the non-selected metrics are not included in the second set of metrics.

29. The method of claim 16, wherein the recommendation includes guidance, the guidance comprising one or more of: avoiding data points identified to be associated with the one or more anomalies and using the second set of metrics.

30. The method of claim 16, wherein the data is associated with one or more metrics from one or more of Group Practice Reporting Option Features, Consumer Assessment of Healthcare Providers Survey Features, and Electronic Health Record Features.

31. A non-transitory computer readable storage medium storing one or more programs, the one or more programs configured to reduce a data processing burden, the one or more programs comprising instructions, which when executed by an electronic device, cause the device to:
receive a first set of metrics for at least one facility;
receive data associated with the first set of metrics from a facility of the at least one facility;
determine one or more anomalies in the received data;
select a second set of metrics from the first set of metrics based on the one or more anomalies, wherein a number of metrics of the second set is less than a number of metrics of the first set of metrics;
reconstruct the non-selected metrics of the first set of metrics based on the second set of metrics; and
output a recommendation that the facility measure the second set of metrics to reduce the data collection burden.

32. The non-transitory computer readable storage medium of claim 31, wherein the first set of metrics is for a plurality of facilities, and wherein the recommendation is applicable to the plurality of facilities.

33. The non-transitory computer readable storage medium of claim 31, wherein the plurality of anomalies are determined by Robust Principal Component Analysis (RPCA).

34. The non-transitory computer readable storage medium of claim 33, wherein the one or more anomalies determined by RPCA are interpreted as a guidance for selecting the second set of metrics.

35. The non-transitory computer readable storage medium of claim 31, wherein the one or more programs includes instructions for inserting anomalies into the received data and determining a value of a parameter associated with a protocol, the value configured to enable the protocol to detect the inserted anomalies and select the second set of metrics.

36. The non-transitory computer readable storage medium of claim 31, wherein the one or more programs includes instructions for determining an accuracy of the recommendation.

37. The non-transitory computer readable storage medium of claim 31, wherein the second set of metrics is selected by Sparse Principal Component Analysis (SPCA).

38. The non-transitory computer readable storage medium of claim 31, wherein reconstructing the non-selected metrics of the first set of metrics comprises computing a variable configured to infer the non-selected metrics of the first set of metrics.

39. The non-transitory computer readable storage medium of claim 38, wherein reconstructing the non-selected metrics of the first set of metrics further comprises inferring the non-selected metrics of the first set of metrics based on the computed variable.

40. The non-transitory computer readable storage medium of claim 31, wherein the recommendation that the facility measure the second set of metrics reduces a data processing burden of the received data without appreciable loss of information.

41. The non-transitory computer readable storage medium of claim 31, wherein the received data includes one or more of real data and synthetic data.

42. The non-transitory computer readable storage medium of claim 31, wherein selection of the second set of metrics includes selection of metrics that are less expensive to measure than non-selected metrics of the first set of metrics, the non-selected metrics are not included in the second set of metrics.

43. The non-transitory computer readable storage medium of claim 31, wherein selection of the second set of metrics includes selection of metrics in which a probability of one or more anomalies in the received data associated with the second set of metrics is smaller than a probability of one or more anomalies in the received data associated with the first set of metrics, the non-selected metrics are not included in the second set of metrics.

44. The non-transitory computer readable storage medium of claim 31, wherein the recommendation includes guidance, the guidance comprising one or more of: avoiding data points identified to be associated with the one or more anomalies and using the second set of metrics.

45. The non-transitory computer readable storage medium of claim 31, wherein the data is associated with one or more metrics from one or more of Group Practice Reporting Option Features, Consumer Assessment of Healthcare Providers Survey Features, and Electronic Health Record Features.

* * * * *